(12) United States Patent
Price, Sr. et al.

(10) Patent No.: US 6,449,894 B1
(45) Date of Patent: Sep. 17, 2002

(54) DECOY APPARATUS WITH ADJUSTABLE PITCH ROTOR BLADE WING ASSEMBLY

(76) Inventors: Fred F. Price, Sr., P.O. Box 12, Wayne, IL (US) 60184; James J. DeSmidt, 741 Duxbury La., Bartlett, IL (US) 60103

( * ) Notice: Subject to any disclaimer, the term of this patent is extended or adjusted under 35 U.S.C. 154(b) by 0 days.

(21) Appl. No.: 09/849,468

(22) Filed: May 4, 2001

Related U.S. Application Data

(63) Continuation-in-part of application No. 09/737,222, filed on Dec. 13, 2000.

(51) Int. Cl.$^7$ .............................................. A01M 31/06
(52) U.S. Cl. ............................................................. 43/3
(58) Field of Search ........................................... 43/2, 3

(56) References Cited

U.S. PATENT DOCUMENTS

| | | | |
|---|---|---|---|
| 2,711,613 A | | 6/1955 | Brown |
| 2,747,316 A | | 5/1956 | Benedetto |
| 3,435,550 A | | 4/1969 | Carlson |
| 3,736,688 A | * | 6/1973 | Caccamo .......................... 43/3 |
| 4,114,308 A | | 9/1978 | Greider |
| 4,620,385 A | * | 11/1986 | Carranza et al. .............. 428/16 |
| 4,651,457 A | | 3/1987 | Nelson et al. |
| 4,656,768 A | | 4/1987 | Thigpen |
| 4,845,873 A | | 7/1989 | Nazlett |
| 4,972,620 A | | 11/1990 | Boler |
| 5,144,764 A | | 9/1992 | Peterson |
| 5,196,961 A | | 3/1993 | Sun |
| 5,392,554 A | * | 2/1995 | Farstad et al. .................... 43/3 |
| 5,515,637 A | | 5/1996 | Johnson |
| 5,862,619 A | * | 1/1999 | Stancil ............................. 43/2 |
| 6,170,188 B1 | * | 1/2001 | Matthews ......................... 43/3 |
| 6,339,894 B1 | * | 1/2002 | Solomon .......................... 43/3 |

* cited by examiner

*Primary Examiner*—Charles T. Jordan
*Assistant Examiner*—Kimberly S. Smith
(74) *Attorney, Agent, or Firm*—Christopher J. Scott; Charles F. Meroni, Jr.; Meroni & Meroni, P.C.

(57) ABSTRACT

The present invention discloses a decoy apparatus with wind-driven rotatable wings. The rotatable wings are mounted on a shaft member, which extends transversely through a bird-like body portion. Adjustable-pitch rotor blades are integrally mounted on the rotatable wings for collecting and converting kinetic wind energy to rotational power in the shaft member. When collected and converted to rotational power, wind energy causes the wings, the shaft member and the rotor blades to rotate in unison through 360 degrees about a horizontal axis of rotation extending through the shaft member. The wings and integrally mounted rotor blades co-rotate in a clockwise direction or in a counter-clockwise direction depending on the wind energy being directed against the rotor blade members. The adjustable pitch rotor blade members thus create wing movement in the wings and in the rotor blades for alluring game located vertically, laterally and longitudinally relative to the decoy apparatus.

18 Claims, 20 Drawing Sheets

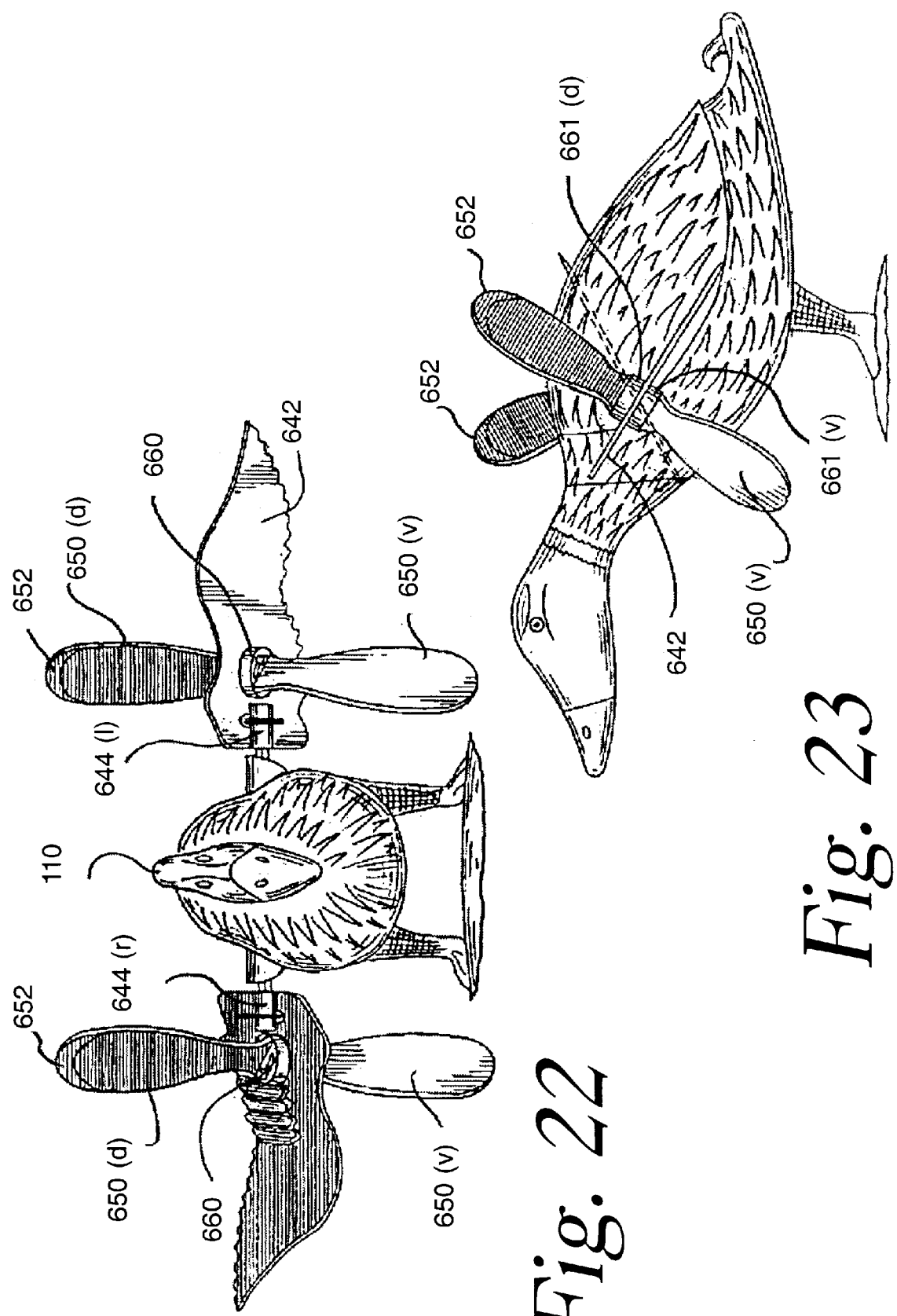

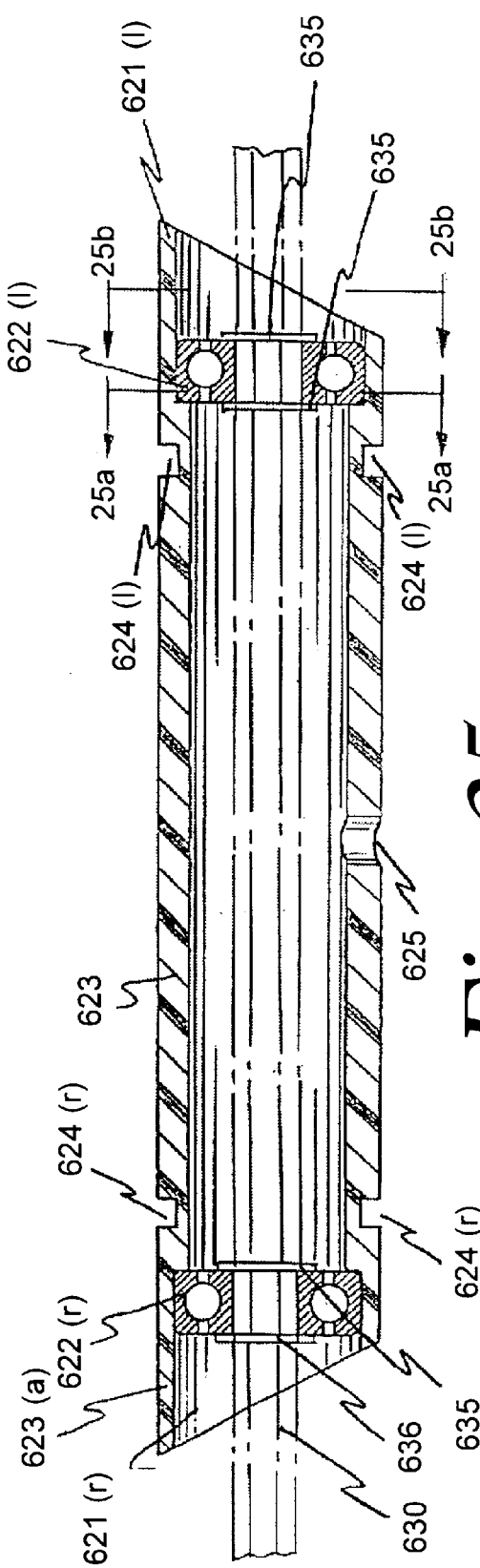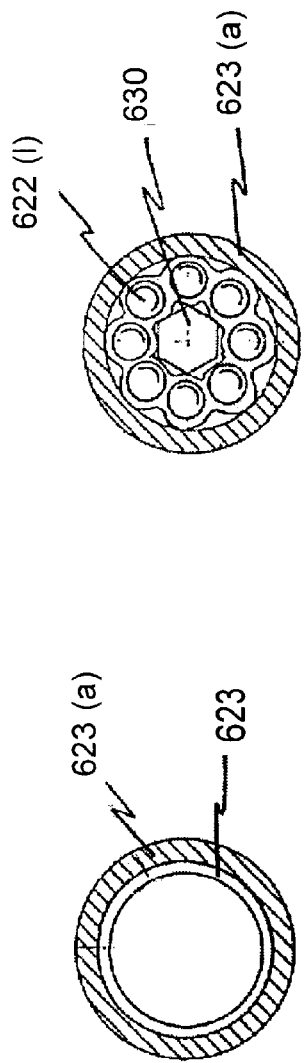
Fig. 25
Fig. 25a
Fig. 25b

DECOY APPARATUS WITH ADJUSTABLE PITCH ROTOR BLADE WING ASSEMBLY

PRIOR HISTORY

This is a Continuation-in-Part Application of Application No. 09/737,222, filed Dec. 13, 2000

BACKGROUND OF THE INVENTION

1. Field of the Invention

The present invention relates to a decoy apparatus, and, more particularly, to a decoy apparatus with rotatable wing assemblies for alluring birds within visual distance of the decoy apparatus regardless of their environmental location.

2. Description of the Prior Art

Decoy art is ancient. Hunter societies on the American Continent have used decoys in their hunt for centuries. These ancient decoys were designed, in part, to bring game birds within close proximity to the hunters due to the relatively primitive weaponry of the day. Bird decoys estimated to be over a thousand years old and made of reeds and feathers have been discovered and preserved from these earlier times. Down through the centuries, hunters have continually endeavored to improve upon their decoys and the process of continual improvement persists to this day.

Despite the trend to constantly improve upon that which has come before, it is well known in the art that waterfowl decoys, in particular, can be very simple and yet allure waterfowl. For example, effective waterfowl decoys can be made from mud lumps, newspapers, bottles, diapers and even rags. Conversely, complex decoys are also effective. Robotic decoys, for example, lure not only other game, but human poachers as well. The more lifelike the decoy, it is argued, the more effective the decoy for alluring game.

In the early 1900's, hunters commonly used trained live game birds to lure wild game birds. The use of these live so-called decoys, however, was outlawed in the United States in 1935, prompting hunters in the United States to find life-like substitutes. Decoy dogma teaches that visually imitative, naturally animated decoys tend to be more effective at luring wildlife. When used with an eye toward wildlife population sustainability, visually imitative, naturally-animated decoys enable the user to reach a hunt limit more efficiently, thus leaving far fewer wounded animals in the environment. Similarly, visually imitative, naturally animated decoys enable users to lure wildlife away from environmental locations where its presence is undesirable. Visually imitative decoys employing motorized systems for animation are among the most effective decoys available.

Decoys employing motorized systems for animation, however, are both detrimental to the environment and have limited effectiveness. Decoys employing motorized systems for animation are environmentally detrimental in that power sources are often discarded into the environment. Further, decoys employing motorized systems for animation are limited in their effectiveness in that the visually apparent animation they exhibit tends to be static, mechanical and highly repetitive. Additionally, motorized systems for animation often conflict with environmental conditions, namely wind conditions, and tend to wear more quickly due to oppositional forces impinging upon mechanically operative parts.

Visually imitative decoys employing wind-actuating systems for animation are preferred. Wind-actuated systems for decoy animation rarely result in environmentally discarded material. Further, wind-actuated systems animate decoys in tune with environmental conditions, namely wind conditions, thereby creating more random, natural animation. In this manner, the alluring effect is maximized. Moreover, wind-actuated systems for decoy animation harness wind energy operate in tune with wind conditions and wear more slowly as a result.

Bird decoys having wind-actuated means for wing movement are known in the prior art and some are described hereinafter. U.S. Pat. No. 4,620,385, which issued to Carranza et al., teaches rotatable wings rotatably received on an axle member and being bracketed to an existing decoy. The wing structures are rigid blade members shaped to receive wind energy and rotate about the axle member. The blades are colored in contrasting colors on opposite sides of the wing so that when the wings rotate, driven by wind energy, a more attractive visual effect is created, which can be seen from greater visual distances. The shape of the rotatable wings is not visually imitative thus limiting decoy effectiveness. Further, the rotatable wings are not integrally formed with the bird decoy body structure, which detracts from the decoy's visually imitative effect thus limiting decoy effectiveness. Moreover, the rotatable wings are not readily viewable from extreme lateral viewpoints thus further handicapping decoy effectiveness.

U.S. Pat. No. 5,144,764, which issued to Peterson, teaches a decoy with wind-actuated flexible wings which when exposed to wind energy fluctuate in an up and down manner. When the wings are oriented in a relaxed state and wind is directed against the wings, lift is generated, causing the wings to rise to an ultimate stall position causing the wings, in turn to fall, thereby creating the effect of life-like wing movement. This disclosure. lacks the preferred realism of an anatomically correct bird body structure and lacks alluring effect at greater visual distances, but is otherwise believed to be an effective wind-animated decoy insofar as the flexible wings are integrally formed with the decoy portion representing the bird body.

U.S. Pat. No. 5,862,619, which issued to Stancil, teaches a rotatable vane used in cooperative association with an existing decoy. The vane employs elliptical blade members shaped to receive wind energy and colored on opposite sides in contrasting colors so as to create a more alluring visual effect upon rotation. The vane is rotatably attached to an existing decoy by a support. The rotation is one-way creating lift thereby and causing the decoy to slightly rise out of water. A motor may be used to supply rotational force in the absence of wind. This disclosure is not visually imitative in that it lacks the preferable integral wing to body configuration and seems awkward in practice. While the vane blades approach a more life-like wing shape, the support structure simultaneously detracts from the lure's visually imitative effect thus limiting decoy effectiveness. Further, the blade members do not produce a visually alternating signal viewable from extreme lateral viewpoints, thus further limiting decoy effectiveness.

None of the prior art discloses wind-driven rotatable wings that employ rotor blades for collecting and converting wind energy into rotational power to rotatably drive a shaft member integrally mounted with a decoy body structure. Further, none of the prior art discloses rotatable wings readily viewable from extreme lateral positions. Rotor blade members mounted on wing structures are not only useful as energy conversion machines but are also readily viewable from extreme lateral positions thereby increasing the range of attraction from primarily anterior, posterior and vertical viewpoints to a virtually universal perspective.

Wildlife exhibit myriad bodily movements. Attempting to simulate these in an artificially animated decoy is difficult. Wind-actuated decoy animation more closely approximates wildlife movement in that wind-actuated decoy animation is in tune with the environment, namely wind conditions, and is not as static or as repetitive as is motorized decoy animation. None of the prior art patents shows a mounting system that enables the user to selectively position the decoy in a triaxial manner. Selective triaxial positioning further enables the user to simulate the myriad bodily movements of which wildlife is capable.

SUMMARY OF THE INVENTION

Accordingly, one objective of the present invention is to provide a decoy apparatus with visually imitative decoy body structure to further enhance decoy effectiveness. Another objective of the present invention is to provide visually imitative decoy wing structure to further enhance decoy effectiveness. Yet another objective of the present invention is to provide integral wing to body configuration to still further enhance decoy effectiveness. Still another objective of the present invention is to provide an energy-efficient, yet environmentally safe means to dynamically animate the decoy apparatus while simultaneously expanding the range of decoy attraction to a maximum extent. Still another objective of the present invention is to provide a manually adjustable or decoy system wherein structural adjustments can be easily made to the decoy apparatus to enhance decoy animation dependent on variable field conditions.

To attain these objectives, the claimed invention generally comprises a wingless imitation waterfowl structure anatomically configured to resemble a wingless waterfowl. The wingless waterfowl structure also has waterfowl-simulating markings and two downwardly extending rigid leg members. Each downwardly extending rigid leg member has a rigid foot member.

The decoy apparatus further comprises a transverse shaft member rotatably received within the wingless waterfowl structure. This shaft member has laterally-opposed terminal ends extending laterally outward from the wingless waterfowl structure each being attached to a laterally-opposed, naturally-shaped wing permitting the naturally-shaped wings and the shaft member to co-rotate through 360 degrees in unison together about the shaft member's axis of rotation.

The decoy apparatus further comprises a plurality of propeller-shaped members cooperatively associated with the wings for collecting wind energy, which when collected is converted to rotational power in the shaft member causing the naturally-shaped wings, the shaft member and the propeller-shaped members to rotate in unison through 360 degrees relative to the wingless imitation waterfowl structure in a clockwise or counter-clockwise direction depending on the wind energy being directed against the propeller-shaped members. The propeller-shaped members thus simultaneously create wing movement both in the naturally-shaped wings for alluring waterfowl located longitudinally and vertically relative to the decoy apparatus and also in the propeller-shaped members themselves for alluring waterfowl located laterally relative to the decoy apparatus.

In the preferred embodiment, each wing of the decoy apparatus includes two vertically aligned dorsally/ventrally-opposed rotor blade members proximally located relative to the wingless imitation body structure and weighted so as to allow the wings to rotatably rest with their ventral surface down facing downward. The vertically aligned, dorsally/ventrally-opposed propeller-shaped rotor blade members each have a pitch control means, which rotatably mounts each vertically-aligned, dorsally/ventrally-opposed propeller-shaped rotor blade member onto the respective wing. Each pitch control means allows for setting the pitch of the rotor blade member enabling each rotor blade member to be positioned in a preset orientation with respect to the wing to adjust for the desired collection of available kinetic wind energy to achieve the most efficient RPM rotational value of the wings and rotor blade members according to the field conditions or availability of kinetic wind energy where the waterfowl decoy apparatus is set-up for decoy attraction purposes.

The wings each further comprise a dorsally located visual identifying pattern, which includes a species-specific variable coloration depending on the waterfowl species sought to be allured. The wings each further comprise a wing length visual feather outline, which is located along the anterior edge of each wing. The wing length visual feather outline has species specific variable coloration depending on the waterfowl species sought to be allured. The dorsally located rotor blade members each have distal edge coloration. The distal edge coloration is variable depending on the waterfowl species sought to be allured. The ventrally located rotor blade members each have proximal edge coloration. The proximal edge coloration is variable depending on the waterfowl species sought to be allured.

In alternative embodiments, the dorsal surface of each wing has light-absorbent coloration and the ventral surface of each wing has light-reflective coloration. The dorsal surface light-absorbent coloration further extends to the dorsally located rotor blade members and the ventral surface light-reflective coloration further extends to the ventrally located rotor blade members. Furthermore, in the alternative embodiments, the dorsal surface of each wing is further distinguished by an outstanding visual identifying pattern, which further comprises a species-specific light-absorbent portion. This species-specific light-absorbent portion has variable coloration depending on the waterfowl species sought to be allured. The outstanding visual identifying pattern further comprises a light-reflective border portion. The light-reflective border portion outlines the species-specific light-absorbent portion to visually distinguish the species-specific light-absorbent portion from the light-absorbent dorsal surface coloration.

This invention further discloses four alternate wing shapes. The first wing shape is disclosed in the preferred embodiment and has a visually correct anatomical wing shape. The second wing shape is disclosed in the first alternative embodiment and has a substantially parabolic wing shape. The third wing shape is disclosed in the second alternative embodiment and has a substantially anatomical wing shape. The fourth wing shape is a further refinement of the wing shape as disclosed in the first alternative embodiment, whereby the substantially parabolic wing shape is distinguished by having a horizontally-aligned Savonius wind machine configuration for adding further wind collection and conversion capability for wing animation.

Additionally, it is a further object of the present invention to simulate the myriad bodily movements of which waterfowl are capable, thereby adding to the effectiveness of the decoy apparatus. Accordingly the decoy apparatus is fixedly mounted on a swivel mounting system. The swivel mounting system allows the decoy apparatus to be selectively oriented in a triaxial fashion further allowing the user to randomly position the decoy apparatus. The decoy apparatus is mounted on a swivel head assembly, which allows for the selective triaxial orientation. A rod-like anchoring post supports the swivel head assembly. The rod-like anchoring post has a support end and an anchoring end opposite the support end. The support end rotatably attaches to the swivel head and the anchoring end has a pointed terminus for piercedly and fixedly anchoring the rod-like anchoring post to the ground.

BRIEF DESCRIPTION OF THE DRAWINGS

Other features of our invention will become more evident from a consideration of the following detailed description of our patent drawings, as follows:

FIG. 22 is a fragmentary front view of the preferred embodiment of the decoy apparatus with staggered wing assemblies.

FIG. 23 is a fragmentary side view of the preferred embodiment of the decoy apparatus with staggered wing assemblies.

FIG. 25 is a cross-sectional front view of the shaft housing and shaft member.

FIG. 25(a) is a lateral view of the shaft housing.

FIG. 25(b) is a lateral view of the shaft housing with inserted bearing member and shaft member.

DETAILED DESCRIPTION OF THE INVENTION

FIRST ALTERNATIVE EMBODIMENT

Figure 1:
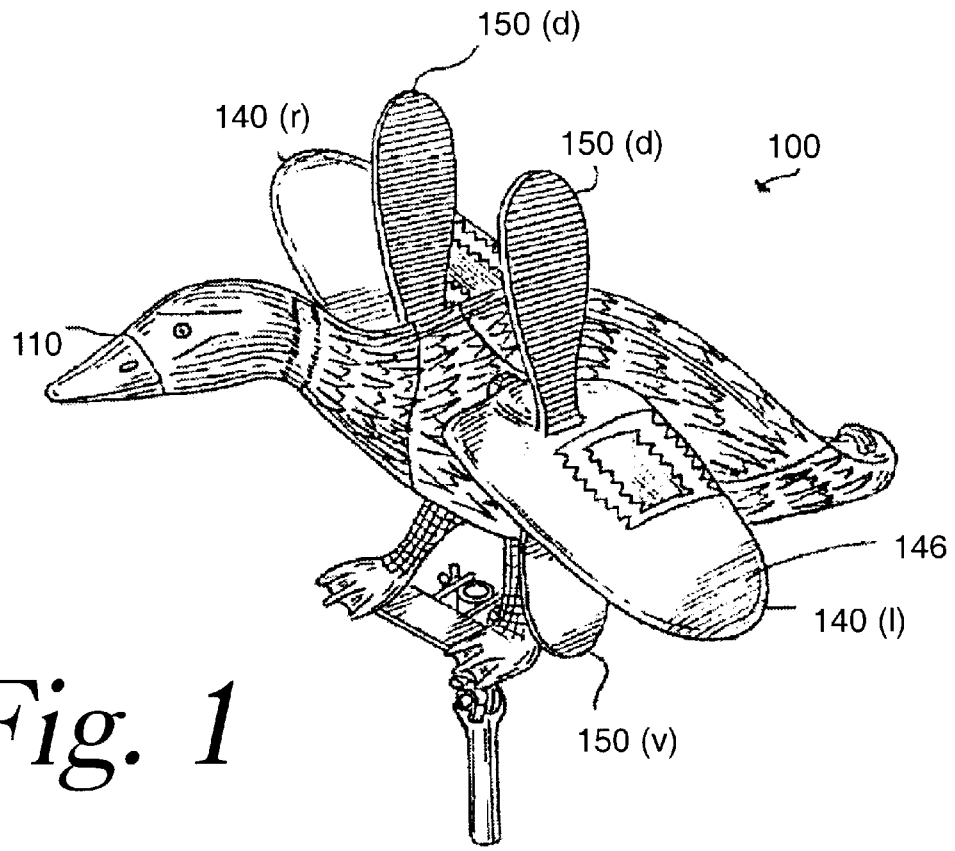
FIG. 1 is a fragmentary perspective view of the first alternative embodiment of the decoy apparatus and swivel mount assembly.
Figure 2:
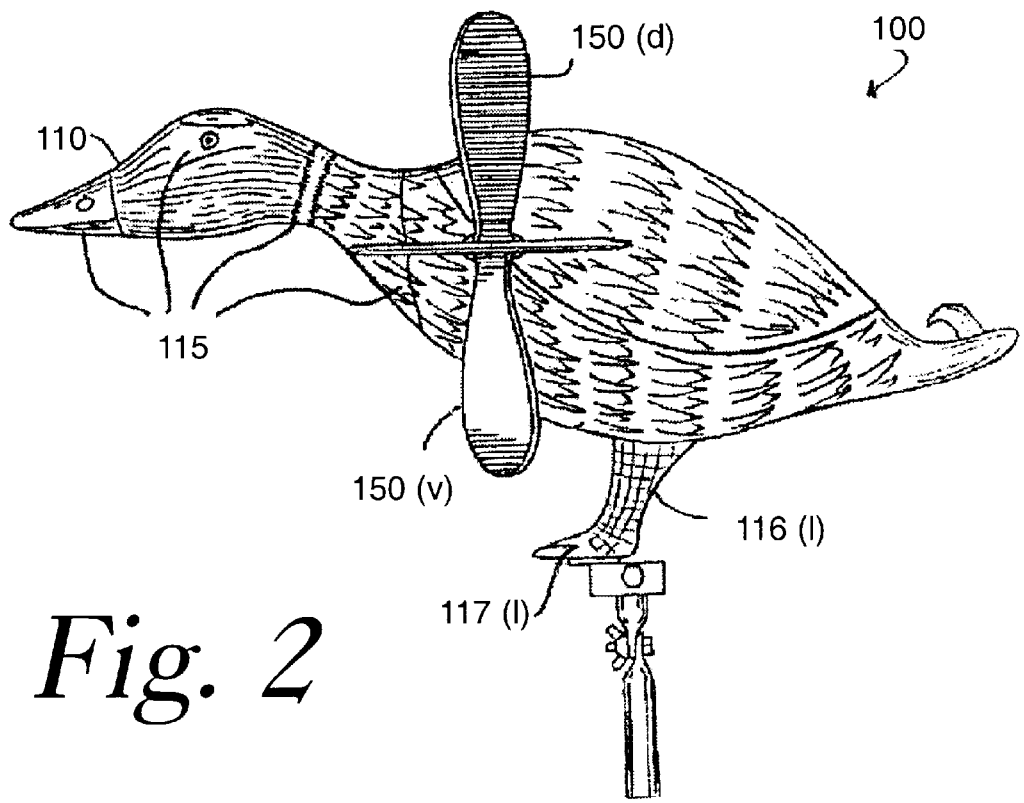
FIG. 2 is a fragmentary side view of the first alternative embodiment of the decoy apparatus and swivel mount assembly.

Referring now to the drawings, the first alternative embodiment of the waterfowl decoy apparatus 100 is generally illustrated in FIG. 1 (fragmentary perspective view) and FIG. 2 (fragmentary side view). The first alternative embodiment of waterfowl decoy apparatus 100 generally consists of a wingless imitation waterfowl structure 110 as shown in FIG. 1, FIG. 2, FIG. 3 (fragmentary front view) and FIG. 4 (fragmentary top plan view), a shaft housing 120 as shown in FIG. 4, a shaft member 130 as shown in FIG. 4 and FIG. 4(a) (enlarged fragmentary cross-sectional view), a wing 140(l) and a wing 140(r) as shown in FIG. 1 and FIG. 3, and dorsally-located rotor blade members 150(d) and ventrally-located rotor blade members 150(v) as shown in FIG. 1 and FIG. 3.

Figure 3:
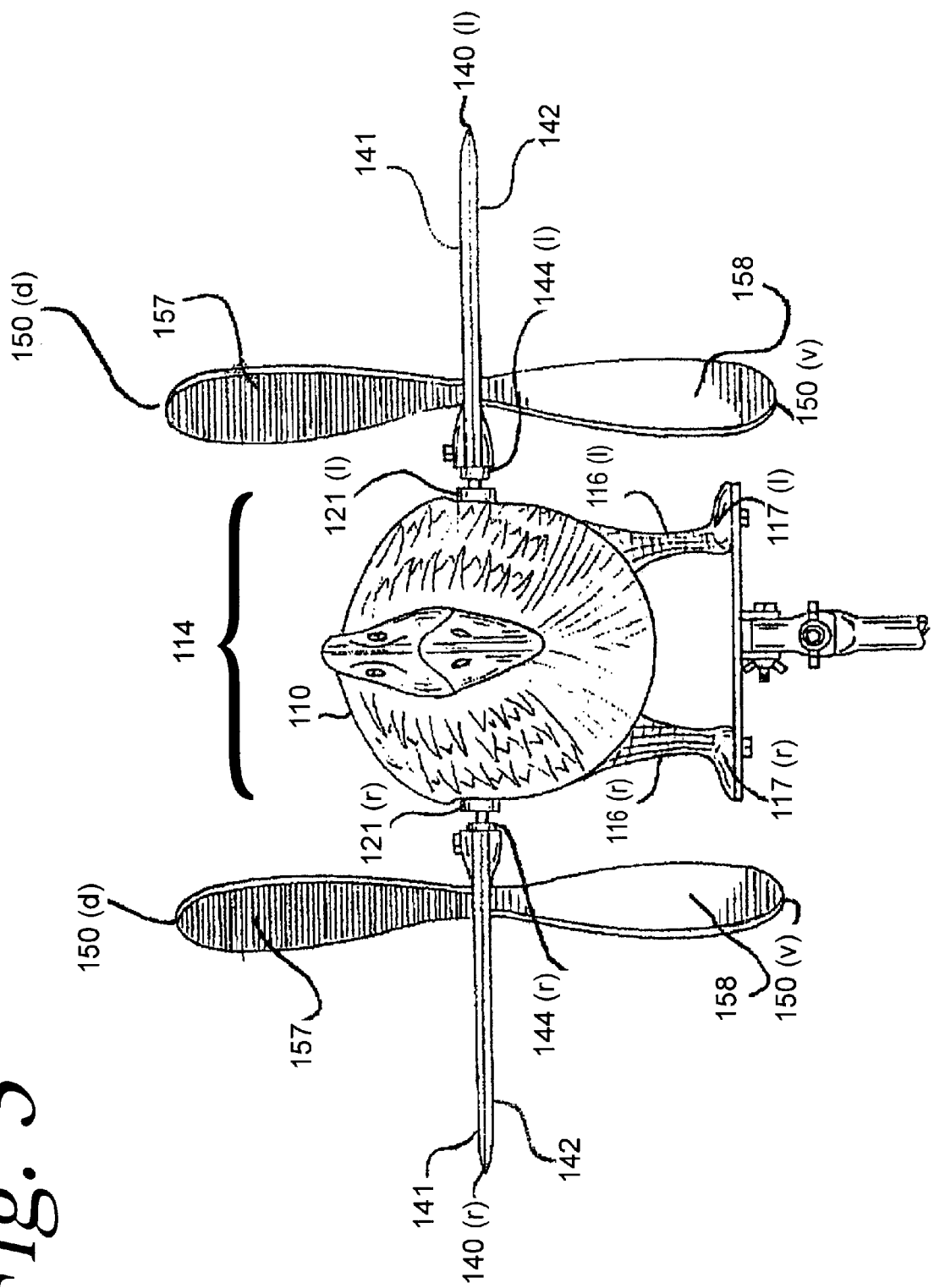
FIG. 3 is a fragmentary front view of the first alternative embodiment of the decoy apparatus and swivel mount assembly.
Figure 4:
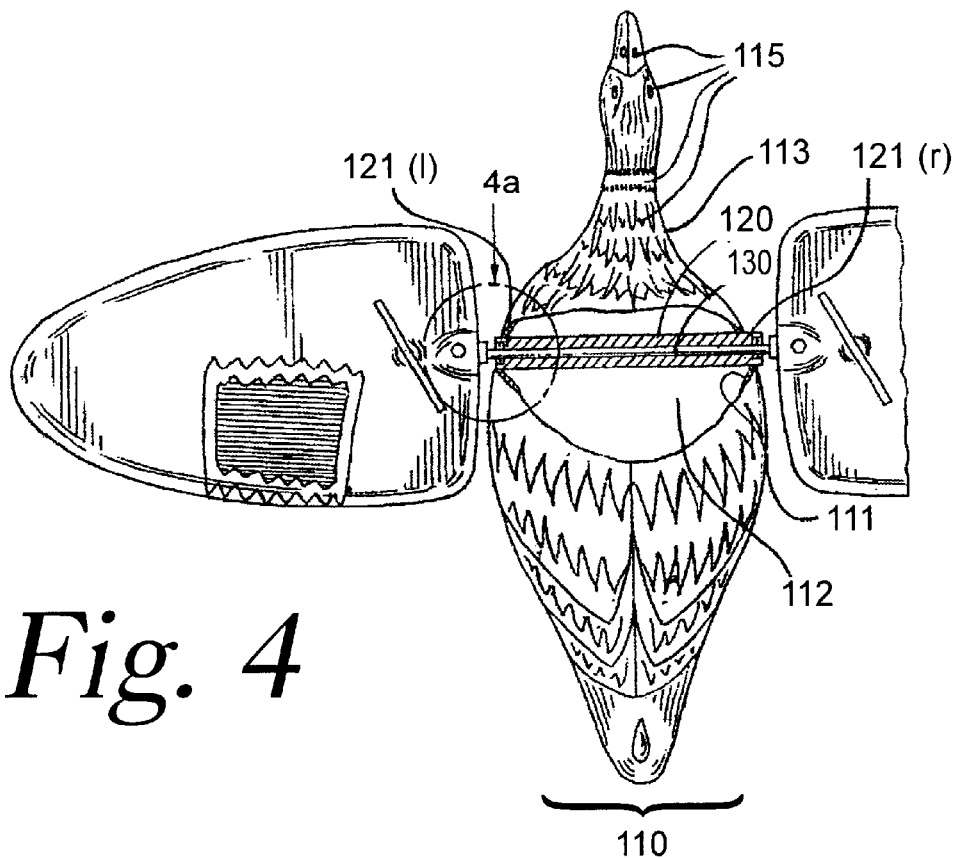
FIG. 4 is a fragmentary top plan view with parts broken away to show wing mounting structure on body of bird.
Figure 4A:
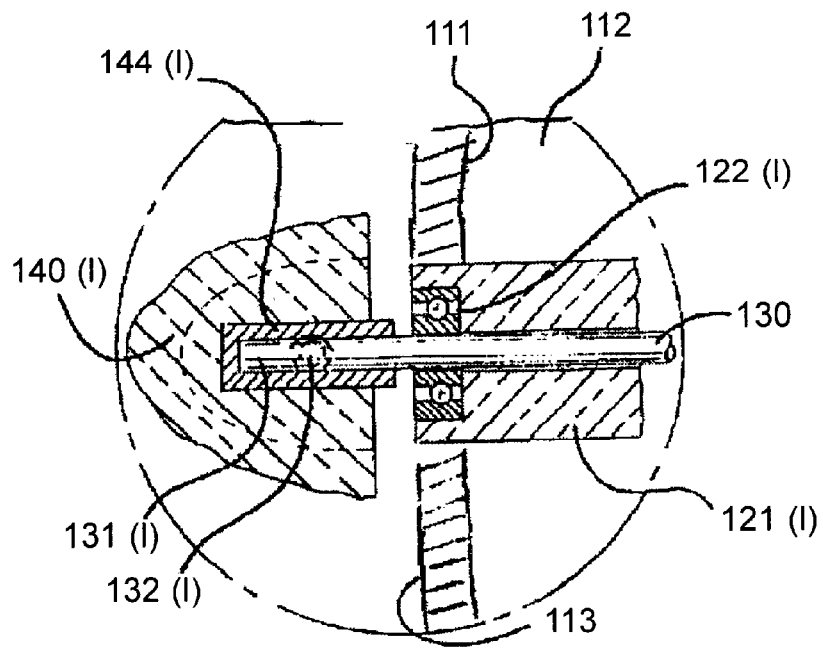
FIG. 4(a) is an enlarged fragmentary cross-sectional view to further show details of communication between wing and bird.

Wingless imitation waterfowl structure 110 as shown in FIG. 1, FIG. 2, FIG. 3 and FIG. 4 is made of a lightweight, rigid, durable, moldable material such as plastic and comprises an inner surface 111 as shown in FIG. 4, which defines an interior body chamber 112 as shown in FIG. 4. Wingless imitation waterfowl structure 110 further comprises an outer surface 113 as shown in FIG. 4 and is anatomically configured to resemble a wingless waterfowl 114 as generally shown in FIG. 3. Wingless waterfowl 114 further has waterfowl-simulating markings 115 as generally shown in FIG. 2 and FIG. 4. Waterfowl-simulating markings 115 may be preferably painted onto wingless imitation waterfowl structure 110 after wingless imitation waterfowl structure 110 is preferably molded. Wingless imitation waterfowl structure 110 also comprises two downwardly extending rigid leg members **116(*l*) and 11 6(*r*) as shown in FIG. 3. Downwardly extending rigid leg member 116(*l*) further has a rigid foot member 117(*l*) as hown in FIG. 2 and FIG. 3 and downwardly extending rigid leg member 116(*r*) further has a rigid foot member 117(*r*) as shown in FIG. 3**.

Shaft housing 120 as shown in FIG. 4 and FIG. **4(*a*) is made of a sturdy, rigid, formable material such as metal, plastic, wood or like material and is comprised of shaft housing ends 121(*l*) and 121(*r*) as shown in FIG. 3 and FIG. 4. Shaft housing ends 121(*l*) and 121(*r*) each extend through inner surface 111 at laterally opposed interior points of interior body chamber 112. Shaft housing ends 121(*l*) and 121(*r*) each further extend through outer surface 113 at laterally opposed exterior points of wingless waterfowl 114. Shaft housing ends 121(*l*) and 121(*r*) are preferably fixedly attached to the laterally opposed exterior points with a strong adhesive. Shaft housing end 121** (*l*) further securely contains a bearing member **122(*l*) and shaft-housing end 121** (*r*) further securely contains a bearing member **122(*r*) where shaft housing end 121(*l*) and bearing member 122(*l*) are shown in FIG.4(*a*). Bearing member 122(*l*) and bearing member 122(*r*) are positioned in shaft housing 120 so as to have a medial side and a lateral side. The medial side of bearing member 122(*l*) and bearing member 122(*r*) are spatially located at about the laterally-opposed interior points where shaft housing ends 121(*l*) and 121(*r*) extend through inner surface 111 of interior body chamber 112. The lateral side of bearing member 122(*l*) and bearing member 122(*r*) are spatially located at about the laterally-opposed exterior points where shaft housing ends 121(*l*) and 121(*r*) extend through outer surface 113 of wingless waterfowl 114**.

Shaft member 130 as shown in FIG. 4 and FIG. **4(*a*) is made of sturdy, rigid, durable material such as metal, plastic, wood or like material and is rotatably received within shaft housing 120. Shaft member 130 has laterally-opposed terminal ends 131(*l*) and 131(*r*) where terminal end 131(*l*) is further shown in FIG. 4(*a*) extending laterally outward from bearing member 122(*l*). Terminal end 131** (*l*) has a fastening member receiving structure **132(*l*) and terminal end 131(*r*) has a fastening member receiving structure 132(*r*) where terminal end 131** (*l*) and fastening member receiving structure **132(*l*) are shown in FIG. 4(*a*). Shaft member 130** has an axis of rotation extending through its long axis.

Figure 5:
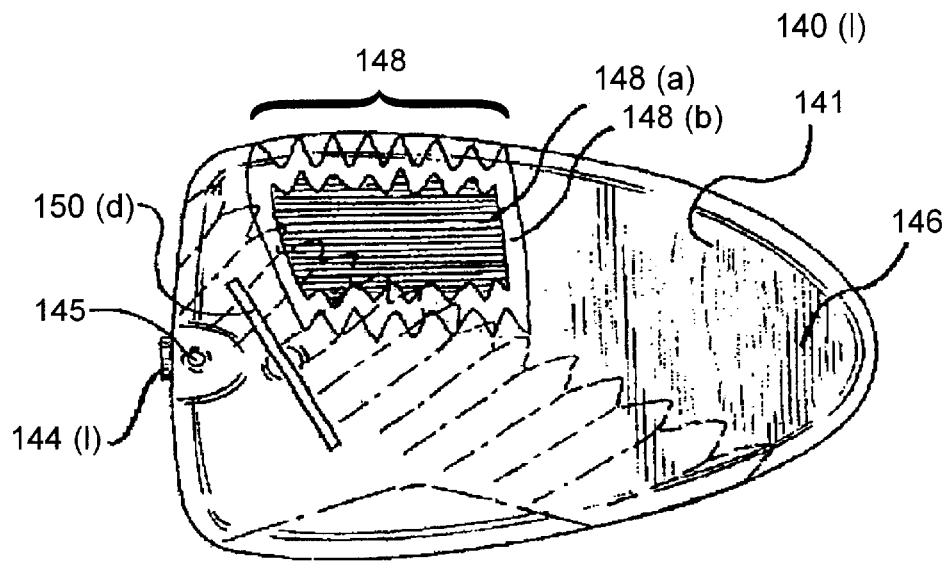
FIG. 5 is a top plan view of one wing of the first alternative embodiment of the decoy apparatus.
Figure 6:
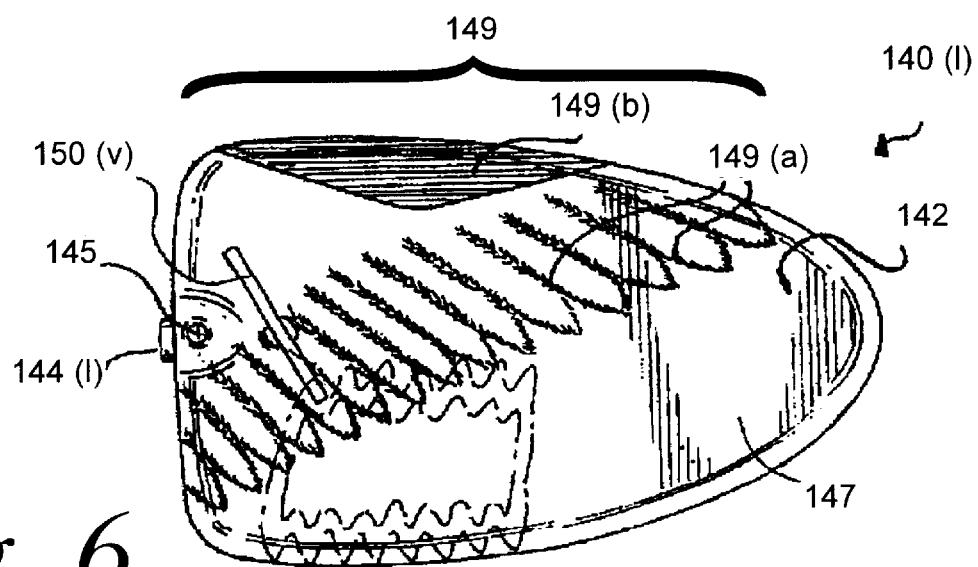
FIG. 6 is a bottom plan view of the wing shown in FIG. 5.

Wing **140(*l*) and wing 140(*r*) are each made of lightweight, rigid, durable, moldable material such as plastic and each have laterally-opposed placement relative to wingless imitation waterfowl structure 110. Wing 140(*l*) and wing 140(*r*) each have a dorsal surface 141 and a ventral surface 142 as shown in FIG. 3 and have a substantially parabolic shape when viewed from a top plan view as shown in FIG. 5 (top plan view of wing 140(*l*)) or when viewed from a bottom plan view as shown in FIG. 6 (bottom plan view of wing 140(*l*)). Wing 140(*l*) further has a proximally-located integrally-formed socket 144(*l*) and wing 140(*r*) further has a proximally-located integrally-formed socket 144(*r*) where wing 140(*l*) and proximally-located integrally-formed socket 144(*l*) is shown in FIG. 4(*a*), FIG. 5 and FIG. 6. Proximally located integrally formed sockets 144(*l*) and 144(*r*) each have socket fastening member structure 145. Proximally located integrally-formed socket 144(*l*) is slidably engaged and securely fastened to terminal end 131(*l*) of shaft member 130 and proximally located integrally-formed socket 144(*r*) is slidably engaged and securely fastened to terminal end 131** (*r*) of shaft member 130 permitting wing **140(*l*), wing 140(*r*) and shaft member 130 to co-rotate through 360 degrees in unison together about the axis of rotation extending through the long axis of shaft member 130**.

Wing **140(*l*) and wing 140(*r*) are further defined by having light-absorbent dorsal surface coloration 146 as shown in FIG. 1 and FIG. 5 and light-reflective ventral surface coloration 147 as shown in FIG. 6. Furthermore, dorsal surface 141 of wing 140(*l*) and wing 140(*r*) is further distinguished by an outstanding visual identifying pattern 148 where outstanding visual identifying pattern 148 of wing 140(*l*) is shown in FIG. 4 and FIG. 5. Outstanding visual identifying pattern 148 further comprises a species-specific light-absorbent portion 148(*a*) and a light-reflective border portion 148(*b*) as shown in FIG. 5. Species-specific light-absorbent portion 148(*a*) has variable coloration depending on the waterfowl species sought to be allured. Light-reflective border portion 148(*b*) outlines species-specific light-absorbent portion 148(*a*) to visually distinguish species-specific light-absorbent portion 148(*a*) from light-absorbent dorsal surface coloration 146**.

Ventral surface 142 of wing **140(*l*) and wing 140(*r*) is further distinguished by an outstanding visual wing pattern 149 where outstanding visual wing pattern 149 of wing 140(*l*) is shown in FIG. 6. Outstanding visual wing pattern 149 further comprises a light-absorbent feather outline 149**(*a*) and an angulated light-absorbent feather outline **149(*b*) opposite light-absorbent feather outline 149(*a*). Upon rotation of wing 140(*l*) and wing 140(*r*) outstanding visual identifying pattern 148 and outstanding visual wing pattern 149** create a visual illusion of species-specific wing coloration in combination with species-specific feathered wing movement.

Wing **140(*l*) and wing 140(*r*) each have one dorsally located rotor blade member 150(*d*) and one ventrally-located rotor blade member 150(*v*) as shown in FIG. 3 and are made of a lightweight, rigid, durable, moldable material such as plastic. Dorsally located rotor blade members 150(*d*) and ventrally located rotor blade members are preferably propeller-shaped. Dorsally-located rotor blade members 150** (*d*) and ventrally-located rotor blade members **150(*v*) as shown in FIG. 3 are vertically-aligned, dorsally/ventrally-opposed and are proximally located relative to wingless imitation waterfowl structure 110. Further, dorsally-located rotor blade members 150(*d*) and ventrally-located rotor blade members 150(*v*) are integrally formed or molded with wings 140(*l*) and 140(*r*) as shown in FIG. 1 and FIG. 3** for collecting kinetic wind energy.

Dorsally located rotor blade members **150(*d*) and ventrally located rotor blade members 150(*v*) collect and convert kinetic wind energy to rotational power in shaft member 130. When converted to rotational power, kinetic wind energy causes wing 140(*l*) and wing 140(*r*), shaft member 130 and dorsally-located rotor blade members 150(*d*) and ventrally-located rotor blade members 150(*v*) to rotate in unison as figuratively shown in FIG. 7 (side view) relative to wingless imitation waterfowl structure 110. Dorsally-located rotor blade members 150(*d*) and ventrally-located rotor blade members 150(*v*) rotate 360 degrees in unison with wing 140(*l*) and wing 140(*r*) in a clockwise direction or in a counter-clockwise direction relative to wingless imitation waterfowl structure 110 depending on the kinetic wind energy being directed against dorsally-located rotor blade members 150(*d*)** and ventrally-located rotor blade members 150(*v*). Dorsally-located rotor blade members 150(*d*) and ventrally-located rotor blade members 150(*v*) thus create wing movement for alluring waterfowl located laterally, longitudinally and vertically relative to waterfowl decoy apparatus 100. When kinetic wind energy is absent, dorsally located rotor blade members 150(*d*) and ventrally located rotor blade members 150(*v*) are rotatably resting. Dorsally located rotor blade members 150(*d*) and ventrally located rotor blade members 150(*v*) are weighted so as to allow wing 140(*l*) and wing 140(*r*) to rest with ventral surface 142 facing down. Additionally, dorsally located rotor blade members 150(*d*) rest dorsally and ventrally-located rotor blade members 150(*v*) rest ventrally as shown in FIG. 1 and FIG. 3.

Figure 7:
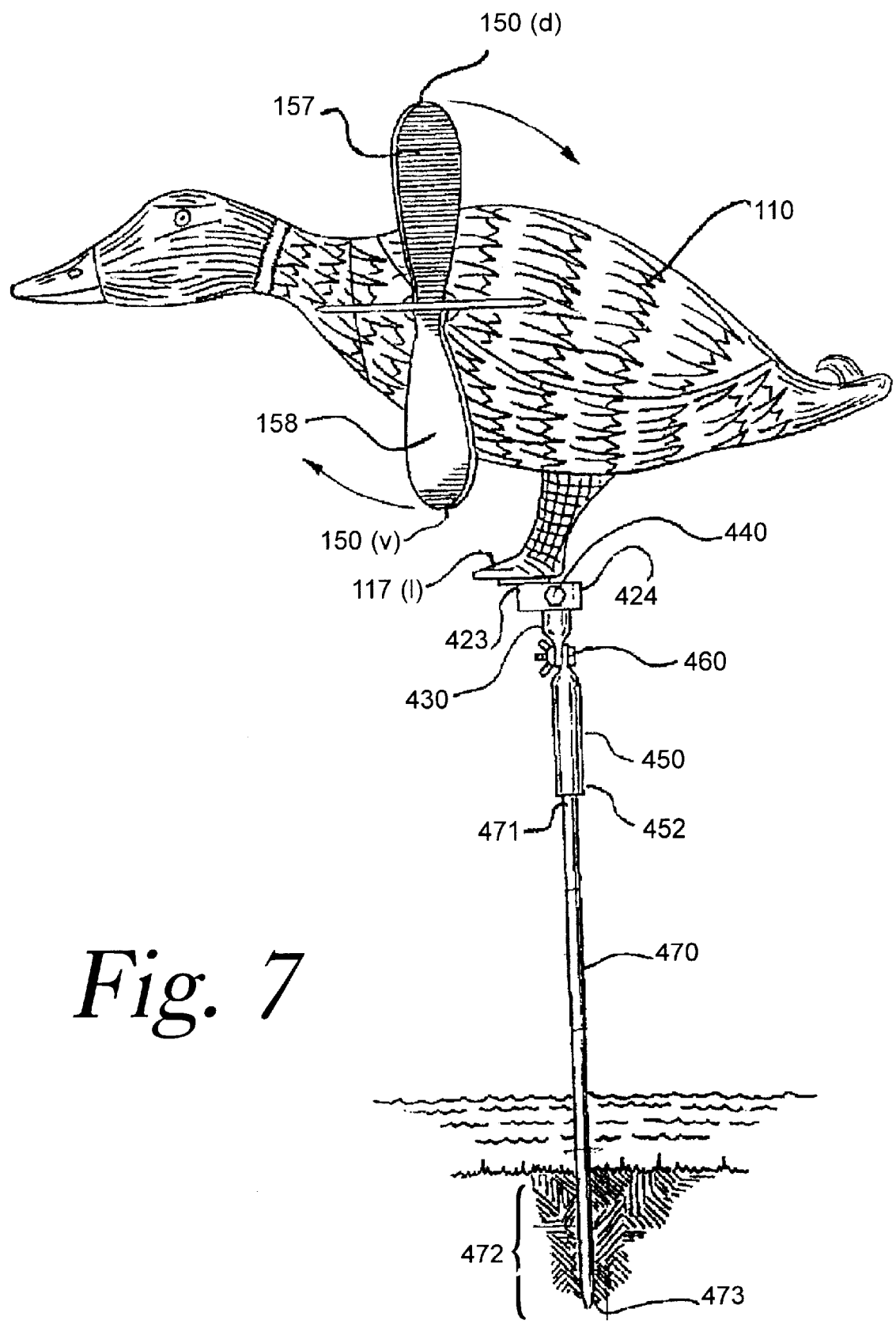
FIG. 7 is a fragmentary side view of the first alternative embodiment of the decoy apparatus and swivel mounting system.

Dorsally-located rotor blade members 150(*d*) have light-absorbent dorsal blade coloration 157 as shown in FIG. 3 and FIG. 7 and ventrally-located rotor blades 150(*v*) have light-reflective ventral blade coloration 158 as shown in FIG. 3 and FIG. 7. When kinetic wind energy is present, dorsally-located rotor blade members 150(*d*) and ventrally-located rotor blade members 150(*v*) rotate 360 degrees in unison with wing 140(*l*) and wing 140(*r*) in a clockwise direction or in a counter-clockwise direction relative to wingless imitation waterfowl structure 110 depending on the kinetic wind energy being directed against dorsally-located rotor blade members 150(*d*) and ventrally-located rotor blade members 150(*v*). FIG. 7, for example, figuratively illustrates clockwise rotation from a left lateral viewpoint.

Dorsally located rotor blade members 150(*d*) and ventrally located rotor blade members 150(*v*) thus create wing movement in wing 140(*l*) and wing 140(*r*) primarily from longitudinal and vertical viewpoints. This occurs through a combination of both the physical rotational movement of wing 140(*l*) and wing 140(*r*) and the alternating visual illusion created by alternating light-absorbent dorsal surface coloration 146 and light-reflective ventral surface coloration 147 as wing 140(*l*) and wing 140(*r*) turn about the axis of rotation extending through the long axis of shaft member 130.

Dorsally located rotor blade members 150(*d*) and ventrally located rotor blade members 150(*v*) also create wing movement in dorsally located rotor blade members 150(*d*) and ventrally-located rotor blade members 150(*v*) primarily from lateral viewpoints. This occurs through a combination of both the physical rotational movement of dorsally-located rotor blade members 150(*d*) and ventrally-located rotor blade members 150(*v*) and the alternating visual illusion created by alternating light-absorbent dorsal blade coloration 157 and light-reflective ventral blade coloration 158 as dorsally-located rotor blade members 150(*d*) and ventrally-located rotor blade members 150(*v*) turn about the axis of rotation extending through the long axis of shaft member 130.

SECOND ALTERNATIVE EMBODIMENT

Figures 8, 9, 10:
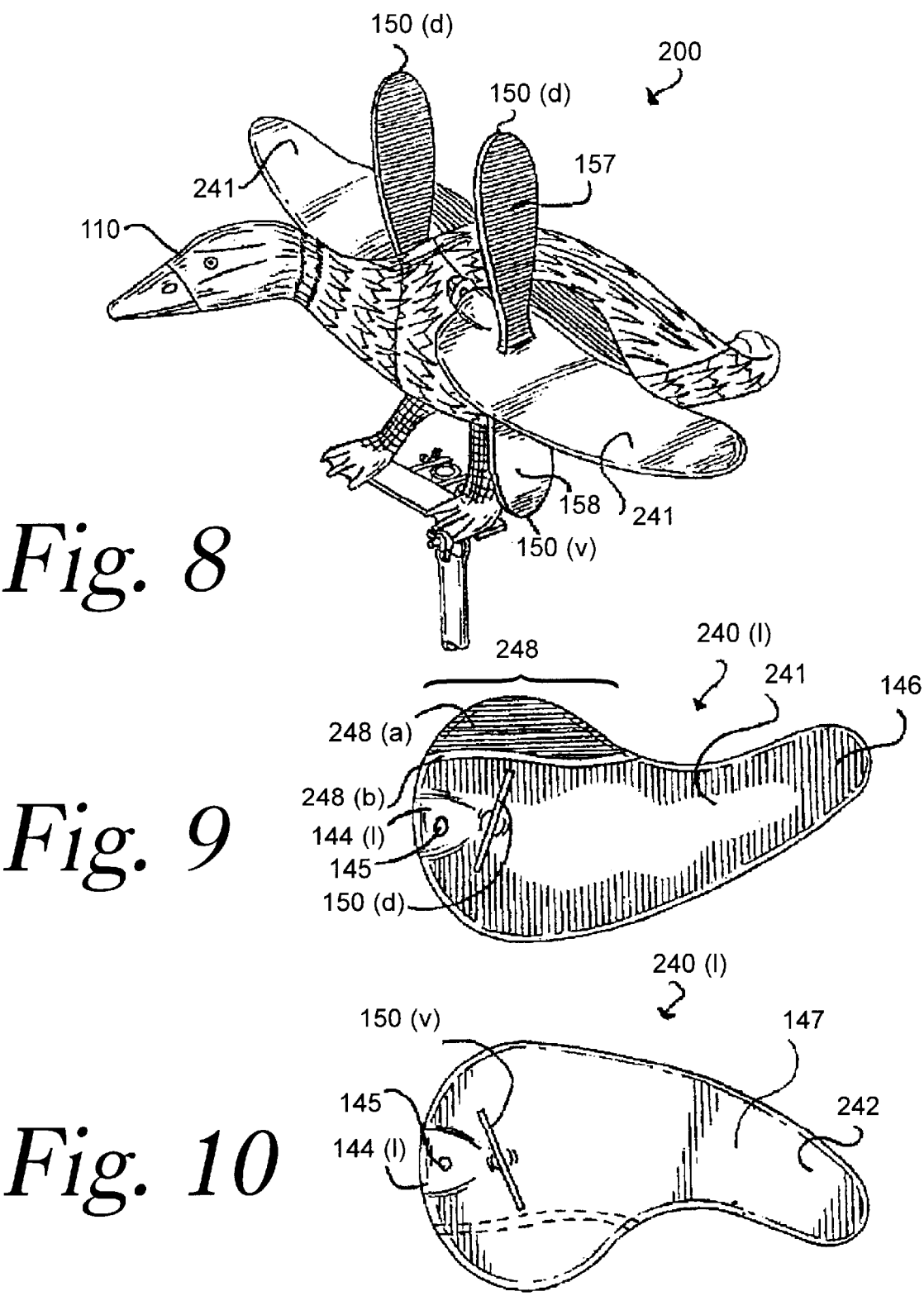
FIG. 8 is a fragmentary perspective view of a second alternative embodiment of the decoy apparatus and swivel mount assembly.
FIG. 9 is a top plan view of one wing of the second alternative embodiment of the decoy apparatus shown in FIG. 8.
FIG. 10 is a bottom plan view of the wing shown in FIG. 9.

A second embodiment of the waterfowl decoy apparatus 200 is shown in FIG. 8 (fragmentary perspective view). The second embodiment of waterfowl decoy apparatus 200 generally consists of wingless imitation waterfowl structure 110, shaft housing 120, shaft member 130, a wing 240(*l*) and a wing 240(*r*) as shown in FIG. 8, and dorsally-located rotor blade members 150(*d*) and ventrally-located rotor blade members 150(*v*). The second embodiment is virtually identical to the preferred embodiment of the waterfowl decoy apparatus 100 save for its wing 240(*l*) and wing 240(*r*).

Wing 240(*l*) and wing 240(*r*) each have laterally-opposed placement relative to wingless imitation waterfowl structure 110. Wing 240(*l*) and wing 240(*r*) each have a dorsal surface 241 and a ventral surface 242 and have a substantially anatomical wing shape when viewed from a top plan view as shown in FIG. 9 for wing 240(*l*) and dorsal surface 241 or bottom plan view as shown in FIG. 10 for wing 240(*l*) and ventral surface 242. Wing 240(*l*) further has proximally-located integrally formed socket 144(*l*) and wing 240(*r*) has proximally-located integrally formed socket 144(*r*) where proximally 5 located integrally-formed socket 144(*l*) is shown in FIG. 9 (top plan view of 240(*l*)) and FIG. 10 (bottom plan view of the wing 240(*l*)). Proximally located integrally formed sockets 144(*l*) and 144(*r*) each have socket fastening member structure 145. Proximally located integrally-formed socket 144(*l*) is slidably engaged and securely fastened to terminal end 131 (*l*) of shaft member 130 and proximally located integrally-formed socket 400 144(*r*) is slidably engaged and securely fastened to terminal end 131(*r*) of shaft member 130 permitting wing 240(*l*), wing 240(*r*) and shaft member 130 to co-rotate through 360 degrees in unison together about the axis of rotation extending through the long axis of shaft member 130.

Wing 240(*l*) and wing 240(*r*) are further defined by having light-absorbent dorsal surface coloration 146 where dorsal surface 241 of wing 240(*l*) is shown in FIG. 9 and light-reflective ventral surface coloration 147 where ventral surface 242 of wing 240(*l*) is as shown in FIG. 10. Furthermore, dorsal surface 241 of wing 240(*l*) and wing 240(*r*) is further distinguished by an outstanding visual identifying pattern 248. Outstanding visual identifying pattern 248 further comprises a species-specific light-absorbent portion 248(*a*) and a light-reflective border portion 248(*b*). Species-specific light-absorbent portion 248(*a*) has variable coloration depending on the waterfowl species sought to be allured. Light-reflective border portion 248(*b*) outlines species-specific light-absorbent portion 248(*a*) to visually distinguish species-specific light-absorbent portion 248(*a*) from light-absorbent dorsal surface coloration 246.

Wing 240(*l*) and wing 240(*r*) each have one dorsally-located rotor blade member 150(*d*) as shown in FIG. 8 and FIG. 9 and one ventrally-located rotor blade member 150(*v*) as shown in FIG. 10 and are made of a lightweight, rigid, durable, moldable material such as plastic. Dorsally-located rotor blade members 150(*d*) and ventrally-located rotor blade members 150(*v*) are integrally formed with wing 240(*l*) and wing 240(*r*) as shown in FIG. 8, FIG. 9 and FIG. 10 for collecting kinetic wind energy.

Dorsally located rotor blade members 150(*d*) and ventrally located rotor blade members 150(*v*) collect and convert kinetic wind energy to rotational power in shaft member 130. When converted to rotational power, kinetic wind energy causes wing 240(*l*) and wing 240(*r*), shaft member 130 and dorsally-located rotor blade members 150(*d*) and ventrally-located rotor blade members 150(*v*) to rotate in unison as figuratively shown in FIG. 7 relative to wingless imitation waterfowl structure 110. Dorsally-located rotor blade members 150(*d*) and ventrally-located rotor blade members 150(*v*) rotate 360 degrees in unison with wing 240(*l*) and wing 240(*r*) in a clockwise direction or in a counter-clockwise direction relative to wingless imitation waterfowl structure 110 depending on the kinetic wind energy being directed against dorsally-located rotor blade members 150(*d*) and ventrally-located rotor blade members 150(*v*). Dorsally-located rotor blade members 150(*d*) and ventrally-located rotor blade members 150(*v*) thus create wing movement for alluring waterfowl located laterally, longitudinally and vertically relative to waterfowl decoy apparatus 200. When kinetic wind energy is absent, dorsally located rotor blade members 150(d) and ventrally located rotor blade members 150(v) are rotatably resting. Dorsally located rotor blade members 150(d) and ventrally located rotor blade members 150(v) are weighted so as to allow wing 240(l) and wing 240(r) to rest with ventral surface 242 facing down. Additionally, dorsally located rotor blade members 150(d) rest dorsally and ventrally-located rotor blade members 150(v) rest ventrally as shown in FIG. 8.

Dorsally-located rotor blade members 150(d) have light-absorbent dorsal blade coloration 157 as shown in FIG. 2 and FIG. 8 and ventrally-located rotor blades 150(v) have light-reflective ventral blade coloration 158 as shown in FIG. 2 and FIG. 8. When kinetic wind energy is present, dorsally-located rotor blade members 150(d) and ventrally-located rotor blade members 150(v) rotate 360 degrees in unison with wing 240(l) and 240(r) in a clockwise direction or in a counter-clockwise direction relative to wingless imitation waterfowl structure 110 depending on the kinetic wind energy being directed against dorsally-located rotor blade members 150(d) and ventrally-located rotor blade members 150(v).

Dorsally located rotor blade members 150(d) and ventrally located rotor blade members 150(v) thus create wing movement in wing 240(l) and wing 240(r) primarily from longitudinal and vertical viewpoints. This occurs through a combination of both the physical rotational movement of wing 240(l) and wing 240(r) and the alternating visual illusion created by alternating light-absorbent dorsal surface coloration 246 and light-reflective ventral surface coloration 247 as wing 240(l) and wing 240(r) turn about the axis of rotation extending through the long axis of shaft member 130.

Dorsally located rotor blade members 150(d) and ventrally located rotor blade members 150(v) thus also create wing movement in dorsally located rotor blade members 150(d) and ventrally-located rotor blade members 150(v) primarily from lateral viewpoints. This occurs through a combination of both the physical rotational movement of dorsally-located rotor blade members 150(d) and ventrally-located rotor blade members 150(v) and the alternating visual illusion created by alternating light-absorbent dorsal blade coloration 157 and light-reflective ventral blade coloration 158 as dorsally-located rotor blade members 150(d) and ventrally-located rotor blade members 150(v) turn about the axis of rotation extending through the long axis of shaft member 130.

THIRD ALTERNATIVE EMBODIMENT

Figure 11:
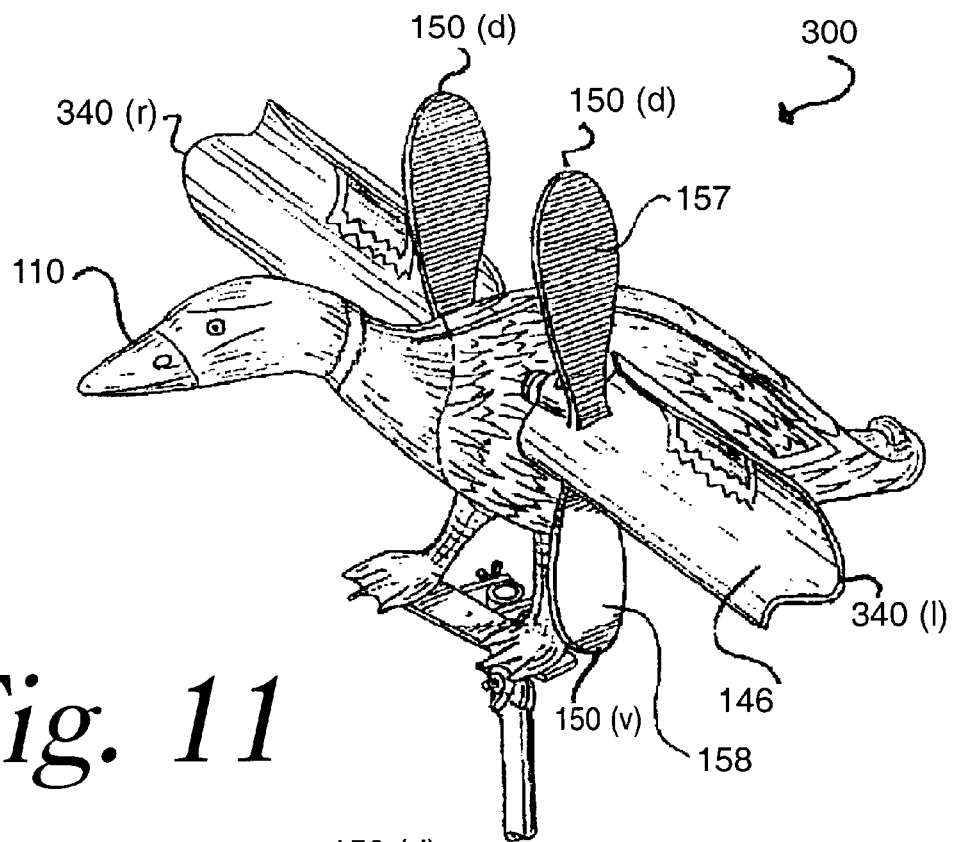
FIG. 11 is a fragmentary perspective view of a third alternative embodiment of the decoy apparatus and swivel mount assembly.

A third embodiment of the waterfowl decoy apparatus 300 is shown in FIG. 11. The third embodiment of waterfowl decoy apparatus 300 generally consists of the wingless imitation waterfowl structure 110 as shown in FIG. 11, shaft housing 120, shaft member 130, a wing 340(l) and a wing 340(r) as shown in FIG. 11, and dorsally-located rotor blade members 150(d) and ventrally-located rotor blade members 150(v). The third embodiment is virtually identical to the preferred embodiment of waterfowl decoy apparatus 100 save for its wing 340(l) and wing 340(r).

Figure 13:
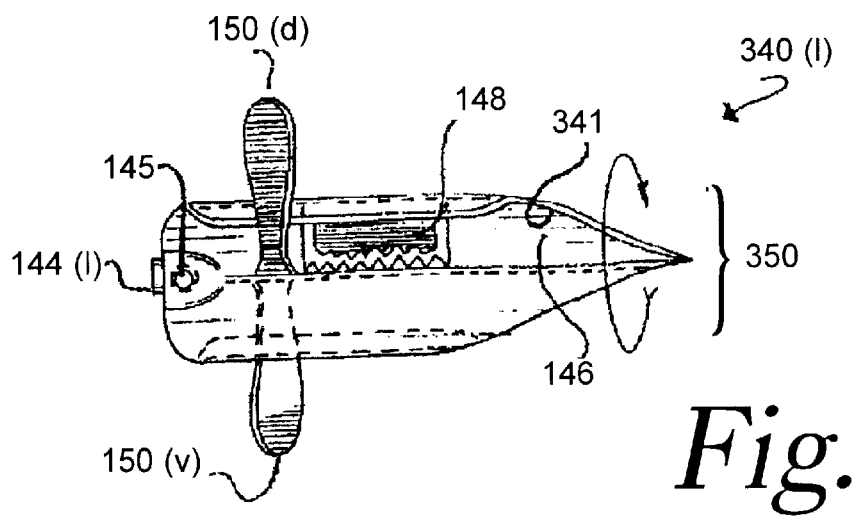
FIG. 13 is a sequential side view of the wing of the third alternative embodiment shown in FIG. 11.
Figure 14:
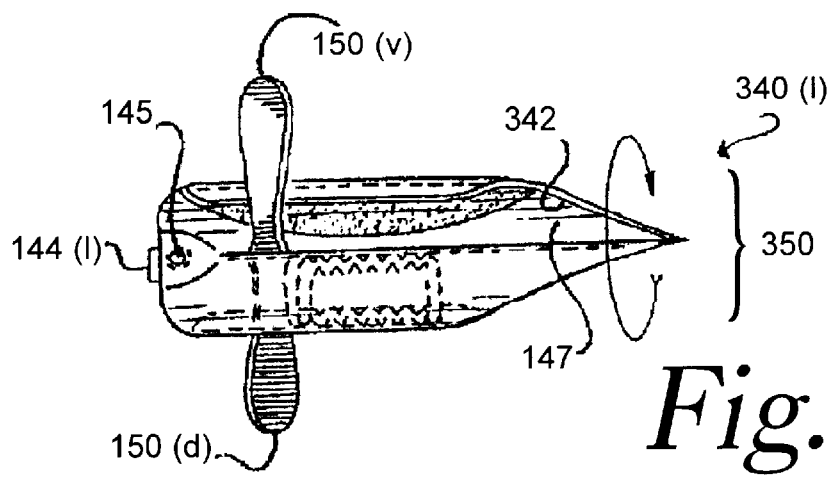
FIG. 14 is a sequential side view of the wing of the third alternative embodiment shown in FIG. 11.

Wing 340(l) and wing 340(r) are each made of lightweight, rigid, durable, moldable material such as plastic and each have laterally-opposed placement relative to wingless imitation waterfowl structure 110. Wing 340(l) and wing 340(r) each have a dorsal surface 341 as shown in FIG. 13 and a ventral surface 342 as shown in FIG. 14. Wing 340(l) further has proximally-located integrally formed socket 144(l) and wing 340(r) further has proximally-located integrally formed socket 144(r) where wing 340(l) and proximally located integrally-formed socket 144(l) are shown in FIG. 13 and FIG. 14. Proximally located integrally formed sockets 144(l) and 144(r) each have socket fastening member structure 145. Proximally-located integrally-formed socket 144(l) is slidably engaged and securely fastened to terminal end 131(l) of shaft member 130 and proximally-located integrally-formed socket 144(r) is slidably engaged and securely fastened to terminal end 131 (r) of shaft member 130 permitting wing 340(l), wing 340(r) and shaft member 130 to co-rotate through 360 degrees in unison together about the axis of rotation extending through the long axis of shaft member 130.

Wing 340(l) and wing 340(r) are further defined by having light-absorbent dorsal surface coloration 146 as shown in FIG. 11 and FIG. 13 and light-reflective ventral surface coloration 147 as shown in FIG. 14. Furthermore, dorsal surface 341 of wing 340(l) and wing 340(r) is further distinguished by outstanding visual identifying pattern 148 as described above.

Figure 12:
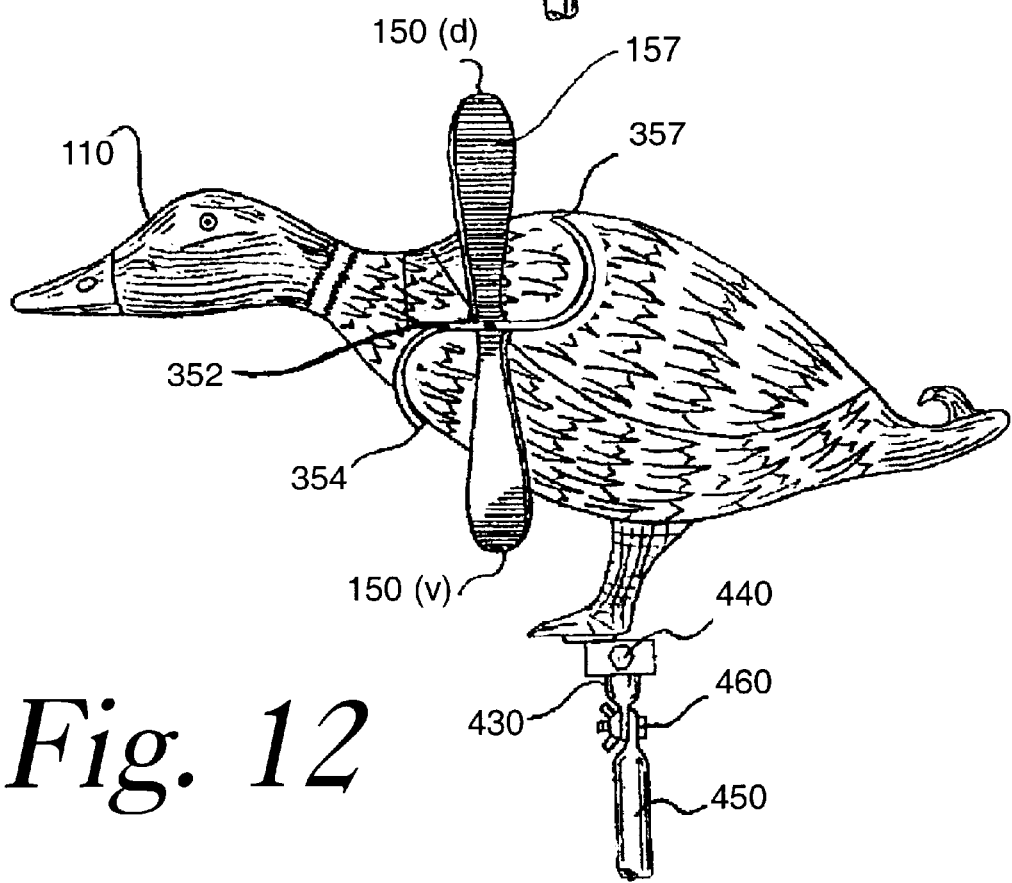
FIG. 12 is a fragmentary side view of the third alternative embodiment and swivel mount assembly shown in FIG. 11.
Figure 15:
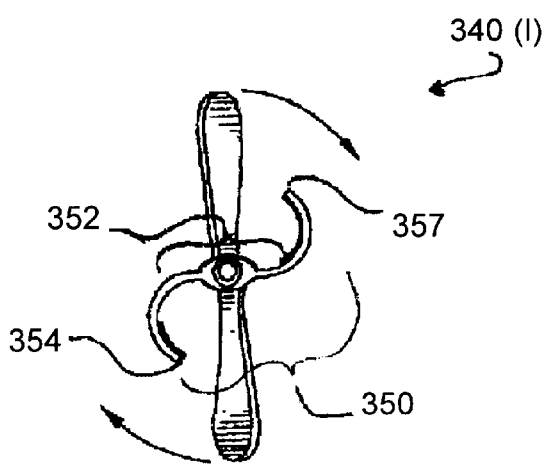
FIG. 15 is a cross-section view of the wing of the third alternative embodiment shown in FIG. 11.

Wing 340(l) and 340(r) are each further defined by having a Savonius wind machine configuration 350 as is generally shown in FIG. 11. Savonius wind machine configuration 350 is herein defined as a machine for collecting and converting kinetic wind energy to rotational power in a centralized axis of rotation comprising S-shaped blade or wing member curvature as shown in FIG. 12. The S-shaped blade or wing curvature has a medial wing region 352 as shown in FIG. 12 and FIG. 15 resting substantially in a geometric plane rotatable about an axis of rotation extending through the long axis of shaft member 130 as figuratively shown in FIG. 13 and FIG. 14. The S-shaped blade or wing curvature has an anteriad wing region having ventral curvature with a ventral terminus 354 as shown in FIG. 12 and FIG. 15. Each ventral terminus 354 rests substantially in a geometric plane perpendicular to the geometric plane of medial wing region 352 as shown in FIG. 12 and FIG. 15. The S-shaped wing curvature further has a posteriad wing region having dorsal curvature with a dorsal terminus 357 as shown in FIG. 12 and FIG. 15. Each dorsal terminus 357 rests substantially in a geometric plane substantially perpendicular to the geometric plane of the medial wing region 352. The geometric plane of each dorsal terminus 357 is also substantially parallel to the geometric plane of each ventral terminus 354. Savonius wind machine configuration 350 allows wing 340(l) and wing 340(r) to further collect wind energy for movement in one rotational direction as figuratively shown in FIG. 13 and FIG. 14.

Wing 340(l) and wing 340(r) each have one dorsally-located rotor blade member 150(d) as shown in FIG. 11 and one ventrally-located rotor blade member 150(v) as shown in FIG. 11 and FIG. 12 and are made of a lightweight, rigid, durable, moldable material such as plastic. Further, dorsally-located rotor blade members 150(d) and ventrally-located rotor blade members 150(v) are integrally formed with wing 340(l) and wing 340(r) as shown in FIG. 11 for collecting kinetic wind energy.

Dorsally located rotor blade members 150(d) and ventrally located rotor blade members 150(v) collect and convert kinetic wind energy to rotational power in shaft member 130. When converted to rotational power, kinetic wind energy causes wing 340(l) and wing 340(r), shaft member 130 and dorsally-located rotor blade members 150(d) and ventrally-located rotor blade members 150(v) to rotate in unison as figuratively shown in FIG. 15 relative to wingless imitation waterfowl structure 110. Dorsally-located rotor blade members 150(d) and ventrally-located rotor blade members 150(*v*) rotate 360 degrees in unison with wings 340(*l*) and 340(*r*) in a clockwise direction or in a counter-clockwise direction relative to wingless imitation waterfowl structure 110 depending on the kinetic wind energy being directed against dorsally-located rotor blade members 150 (*d*) and ventrally-located rotor blade members 150(*v*) and Savonius wind machine configuration 350. FIG. 15, for example, figuratively illustrates clockwise rotation from a left lateral viewpoint. Savonius wind machine configuration 350 adds further wind collection capability in this rotational direction.

Dorsally-located rotor blade members 150(*d*) and ventrally-located rotor blade members 150(*v*) thus create wing movement for alluring waterfowl located laterally, longitudinally and vertically relative to waterfowl decoy apparatus 300. When kinetic wind energy is absent, dorsally located rotor blade members 150(*d*) and ventrally located rotor blade members 150(*v*) are rotatably resting. Dorsally located rotor blade members 150(*d*) and ventrally located rotor blade members 150(*v*) are weighted so as to allow wing 340(*l*) and wing 340(*r*) to rest with ventral surface 342 facing down. Additionally, dorsally located rotor blade members 150(*d*) rest dorsally and ventrally-located rotor blade members 150(*v*) rest ventrally as shown in FIG. 12.

Dorsally-located rotor blade members 150(*d*) have light-absorbent dorsal blade coloration 157 as shown in FIG. 11 and FIG. 12 and ventrally-located rotor blades 150(*v*) have light-reflective ventral blade coloration 158 as shown in FIG. 11 and FIG. 12. When kinetic wind energy is present, dorsally-located rotor blade members 150(*d*) and ventrally-located rotor blade members 150(*v*) rotate 360 degrees in unison with wing 340(*l*) and wing 340(*r*) in a clockwise direction or in a counter-clockwise direction relative to wingless imitation waterfowl structure 110 depending on the kinetic wind energy being directed against dorsally-located rotor blade members 150(*d*) and ventrally-located rotor blade members 150(*v*).

Dorsally-located rotor blade members 150(*d*) and ventrally-located rotor blade members 150(*v*) thus create wing movement in wing 340(*l*) and wind 340(*r*) primarily from longitudinal and vertical viewpoints. This occurs through a combination of both the physical rotational movement of wing 340(*l*) and wing 340(*r*) and the alternating visual illusion created by alternating light-absorbent dorsal surface coloration 146 and light-reflective ventral surface coloration 147 as wing 340(*l*) and wing 340(*r*) turn about the axis of rotation extending through the long axis of shaft member 130. Dorsally located rotor blade members 150(*d*) and ventrally located rotor blade members 150(*v*) thus also create wing movement in dorsally located rotor blade members 150(*d*) and ventrally-located rotor blade members 150 (*v*) primarily from lateral viewpoints. This occurs through a combination of both the physical rotational movement of dorsally-located rotor blade members 150(*d*) and ventrally-located rotor blade members 150(*v*) and the alternating visual illusion created by alternating light-absorbent dorsal surface coloration 157 and light-reflective ventral surface coloration 158 as dorsally-located rotor blade members 150(*d*) and ventrally-located rotor blade members 150(*v*) turn about the axis of rotation extending through the long axis of shaft member 130.

PREFERRED EMBODIMENT

Figure 18:
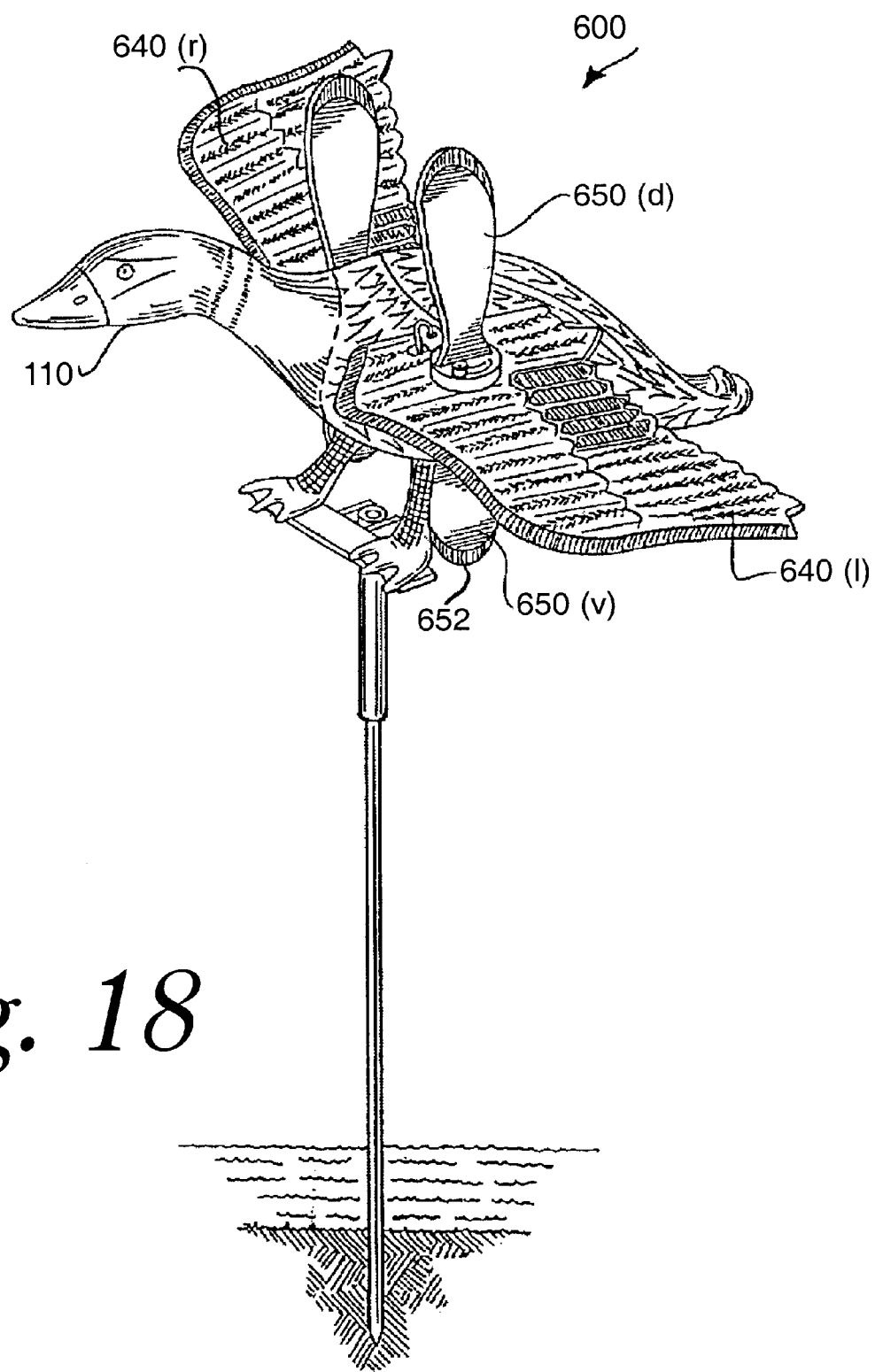
FIG. 18 is a fragmentary perspective view of the preferred embodiment of the decoy apparatus and swivel mount assembly with unstaggered wing assemblies.
Figure 19:
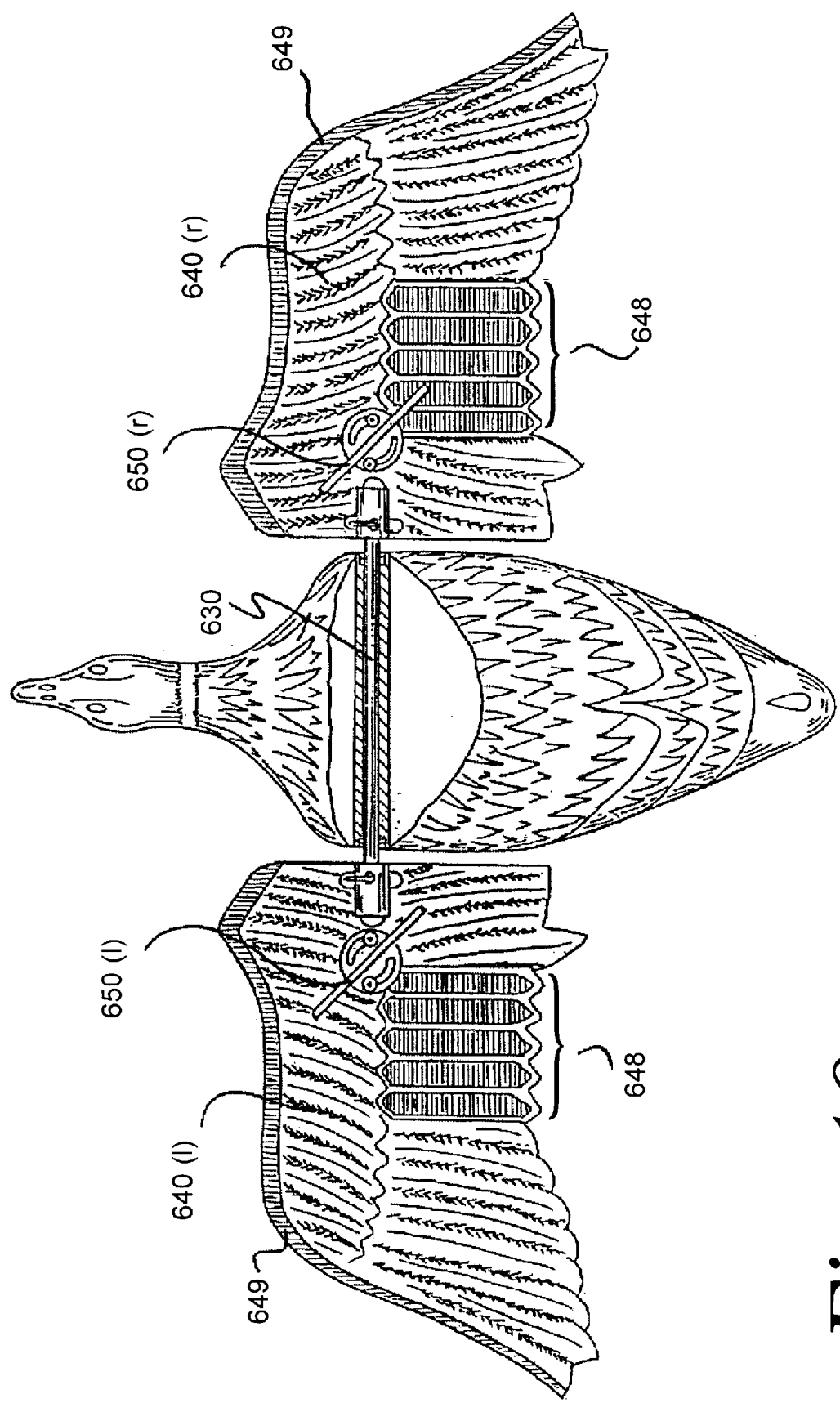
FIG. 19 is a fragmentary top plan view of the preferred embodiment of the decoy apparatus with parts broken away to show wing mounting structure on body of bird.
Figure 24:
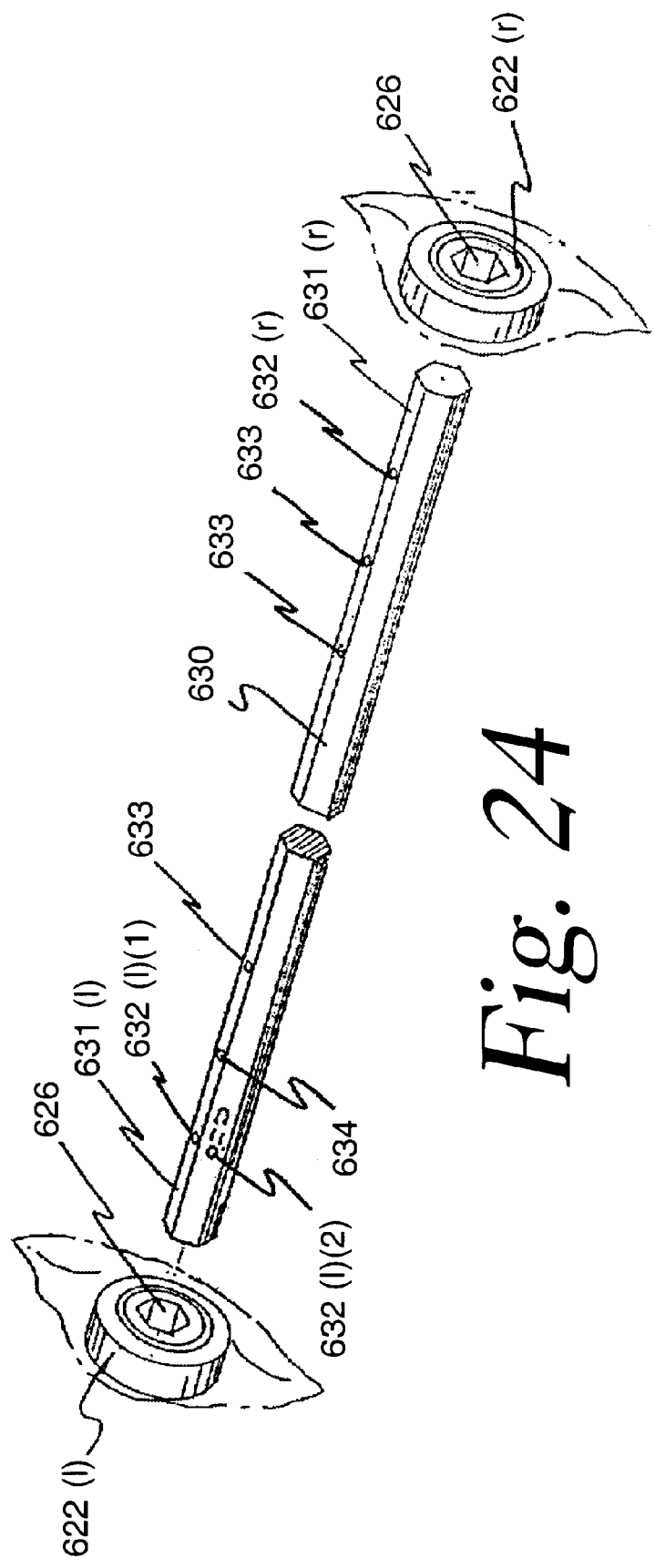
FIG. 24 is a fragmentary exploded perspective view of the hexagonal shaft member and bearing members.
Figure 26:
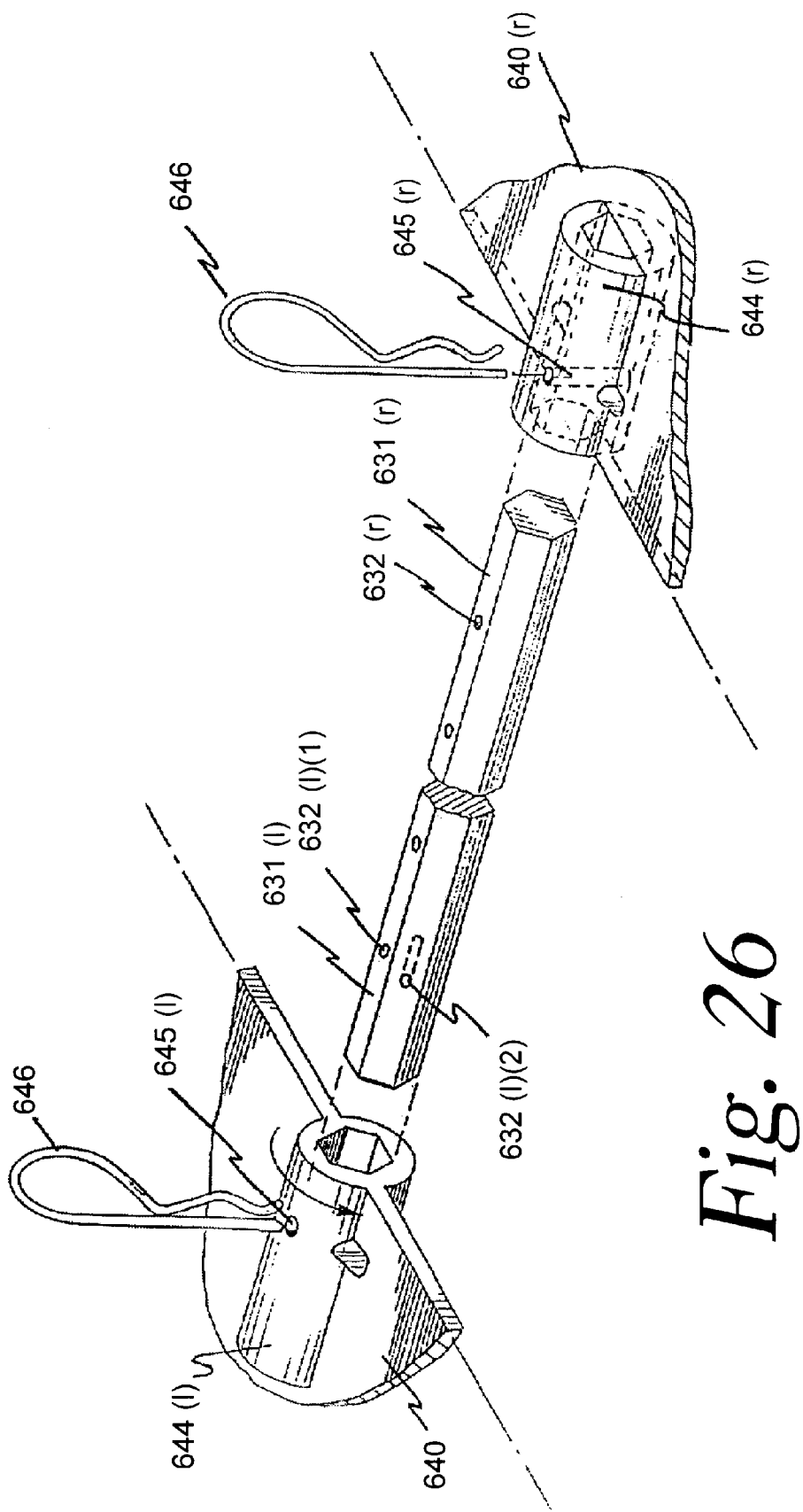
FIG. 26 is a fragmentary exploded perspective view of the shaft member with parts broken away and sockets.

The preferred embodiment of the waterfowl decoy apparatus 600 is shown in FIG. 18. The preferred embodiment of waterfowl decoy apparatus 600 generally consists of wingless imitation waterfowl structure 110, shaft housing 620 as shown in FIG. 25, FIG. 25(*a*) and FIG. 25(*b*), bearing members 622(*l*) and 622(*r*) as shown in FIG. 24 and FIG. 25, a shaft member 630 as shown in FIG. 19, FIG. 24 and FIG. 25, a wing 640(*l*) and a wing 640(*r*) as shown in FIG. 19, dorsally-located rotor blade members 650(*d*) and ventrally-located rotor blade members 650(*v*) as shown in FIG. 22. The preferred embodiment is virtually identical to the alternative embodiments of waterfowl decoy apparatus 100, waterfowl decoy apparatus 200 and waterfowl decoy apparatus 300 save for its shaft housing 620, its bearing members 622(*l*) and 622(*r*), its shaft member 630, its wing 640(*l*) and wing 640(*r*), its dorsally-located rotor blade members 650 (*d*), its ventrally-located rotor blade members 650(*v*), and an additional pitch control assembly 660 on each wing for manually adjusting the pitch of dorsally-located rotor blade members 650(*d*) and ventrally-located rotor blade members 650(*v*). Pitch control assembly 660 is shown in FIG. 27 and FIGS. 29–33. Additionally, preferred embodiment 600 discloses improved proximally located integrally formed hexagonal socket 644(*l*) of wing 640(*l*) and proximally-located integrally formed hexagonal socket 644(*r*) of wing 640(*r*) as shown in FIG. 26.

Shaft housing 620 as shown in FIG. 25 is distinguished from shaft housing 120 in that shaft housing 620 is designed to further contribute to the alluring effects of waterfowl decoy apparatus 600 by obscuring from sight mechanical parts, namely exposed portions of shaft member 630 and bearing members 622(*l*) and 622(*r*). Shaft housing 620 is also designed to shield mechanical parts, namely exposed portions of shaft member 630 and bearing members 622(*l*) and 622(*r*) from weather conditions, namely water and other airborne matter. To this end, shaft housing 620 has sloped shaft housing ends 621(*l*) and 621(*r*). Shaft housing 620 is cut at desired angles such that shaft housing end 621(*l*) and shaft housing end 621(*r*) extend laterally from wingless imitation waterfowl structure 110 to the greatest degree at the dorsal-most region of shaft housing 620. The degree of lateral extension of shaft housing end 621 (*l*) and shaft housing end 621 (*r*) decreases symmetrically from the dorsal-most region of shaft housing 620 to the ventral-most region of shaft housing 620 such that from a front plan view shaft housing ends 621(*l*) and 621 (*r*) appear sloped, thus simultaneously creating a protective shield from airborne matter for medial portions of shaft member 630 and bearing members 622(*l*) and 622(*r*), while also creating visual blinds from game having vertical location for shaft member 630 and bearing members 622(*l*) and 622(*r*).

Shaft housing 620 has wall thickness 623 as shown in FIG. 25. Shaft housing end 621(*l*) and shaft housing end 621(*r*) are each bored approximately half the width of wall thickness 623 to bore thickness 623(*a*) as shown in FIG. 25 and FIG. 25(*a*). Bore thickness 623(*a*) extends into shaft housing end 621(*l*) to allow bearing member 622(*l*) to be inserted into shaft housing end 621(*l*) such that the medial side of bearing member 622(*l*) rests against wall thickness 623 and the lateral side of bearing member 622(*l*) rests inside shaft housing end 621 (*l*) such that the proximal-most portion of shaft housing end 621(*l*) extends laterally from the lateral side of bearing member 622(*l*) as shown in FIG. 25. Bore thickness 623(*a*) extends into shaft housing end 621(*r*) to allow bearing member 622(*r*) to be inserted into shaft housing end 621 (*r*) such that the medial side of bearing member 622(*r*) rests against wall thickness 623 and the lateral side of bearing member 622(*r*) rests inside shaft housing end 621(*r*) such that the proximal-most portion of shaft housing end 621(*r*) extends laterally from the lateral side of bearing member 622(*r*) as also shown in FIG. 25.

Shaft housing 620 has one circumferential notched groove **624(*l*) medial to bearing member 622(*l*) and one circumferential notched groove 624(*r*) medial to bearing ember 622 (*r*). Notched grooves 624(*l*) and 624(*r*) are made by undercutting into the wall thickness 623 around the circumference of shaft housing 620. Notched grooves 624(*l*) and 624(*r*) are made by cutting through wall thickness 623 to a desired notch depth. Notched grooves 624(*l*) and 624(*r*) have notch width corresponding to the wall thickness of wingless imitation waterfowl structure 110 such that when shaft housing 620 is inserted into wingless imitation waterfowl structure 110, notched grooves 624(*l*) and 624(*r*) securely receive inner surface 111 and outer surface 113 and contribute to securely mounting shaft housing 620 in wingless imitation waterfowl structure 110. The notch depth of notched grooves 624(*l*) and 624(*r*) should contact inner surface 111 and outer surface 113 to further contribute to securely mounting shaft housing 620 in wingless imitation waterfowl structure 110**.

Shaft housing 620 further has at least one water drain structure 625 located on the ventral-most region of shaft housing 620. Water drain structure 625 may be made by drilling or cutting through wall thickness 623 of shaft housing at the desired location along the ventral-most region of shaft housing 620 to allow moisture trapped inside shaft housing 620 to escape. Further, it is thought that water drain structure 625 contributes to the alluring effect of waterfowl decoy apparatus 600 by positively modifying sound created by moving parts.

Shaft housing end **621(*l*) securely contains bearing member 622(*l*) and shaft housing end 621(*r*) further securely contains bearing member 622(*r*) where bearing member 622(*l*) and bearing member 622(*r*) are shown in FIG. 24. Bearing members 622(*l*) and 622(*r*) are distinguished from bearing members 122(*l*) and 122(*r*) in that bearing member 622(*l*) and bearing member 622(*r*) have hexagonal shaped shaft receiving structure 626 as shown in FIG. 24. Bearing members 622(*l*) and 622(*r*) are preferably of a high quality bearing to maintain the efficiency of waterfowl decoy apparatus 600**.

Shaft member 630 as shown in FIG. 24 is hexagonal shaped and made of sturdy, rigid, durable material such as metal, plastic, wood or like material. Shaft member 630 is rotatably received within shaft housing 620. Shaft member 630 is made has laterally-opposed terminal ends **631(*l*) and 631(*r*) as shown in FIG. 24 and FIG. 26. Terminal end 631(*l*) has two hairpin receiving structures 632(*l*)(1) and 632(*l*)(2) and terminal end 631(*r*) has one hairpin receiving structure 632(*r*) as further shown in FIG. 24 and FIG. 26. The two hairpin receiving structures 632(*l*)(1) and 632(*l*)(2) and the one hairpin receiving structure 632(*r*) are equidistant from the opposite ends of hexagonal shaft member 630 as shown in FIG. 24 and FIG. 26. Hairpin receiving structures 632(*l*)(1) and 632(*r*) have longitudinal axes, which lie in the same plane. Hairpin receiving structure 632(*l*)(2) has a longitudinal axis, which lies in a plane 60 degrees offset from the plane in which hairpin receiving structures 632(*l*)(1) and 632(*r*)** lie.

Shaft member 630 further has three roll pin receiving structures 633 as shown in FIG. 24. The medial two roll pin receiving structures 633 are located medial to bearing members **622(*l*) and 622(*r*). Two roll pins 635 are inserted into roll pin receiving structures 633 to securely holding shaft member 630 in position through bearing members 622(*l*) and 622(*r*) as shown in FIG. 25. The medial two roll pin receiving structures are equidistant from opposite ends of shaft member 630. The third roll pin receiving structure 633 lies lateral to bearing member 622(*r*). A third roll pin 635 is inserted into the third roll pin receiving structure 633 to further securely hold shaft member 630 in position through bearing members 622(*l*) and 622(*r*). Roll pin receiving structures 633 have longitudinal axes, which lie in the same plane as the plane in which hairpin receiving structures 632(*l*)(1) and 632(*r*)** lie.

Shaft member 630 further has cotter key receiving structure 634 as shown in FIG. 24. Cotter key receiving structure 634 is located lateral to bearing member **622(*l*). Cotter key 636 is inserted into cotter key receiving structure to further contribute to securely holding shaft member 630 in position through bearing members 622(*l*) and 622(*r*) as shown in FIG. 25. Cotter key 636 further serves a disconnect function in that cotter key 636 is more easily removed to aid in disassembling shaft member 630 from shaft housing 620. Cotter key receiving structure 634 and the third roll pin receiving structure 633 are equidistant from the opposite ends of shaft member 630. Cotter key receiving structure 634 has a longitudinal axis, which lies in the same plane as the plane in which roll pin receiving structures 633 lie. Shaft member 630 has an axis of rotation extending through its long axis, which lies in the same plane in which cotter key receiving structure 634 lies. Hairpin receiving structures 632(*l*)(1) and 632(*l*)(2) lie in a plane perpendicular to the plane in which the long axis of shaft member 630** lies.

Hairpin receiving structures **632(*l*)(1), 632(*l*)(2), 632(*r*), roll pin receiving structures 633, and cotter key receiving structure 634 are made by boring or drilling through shaft member 630 from one hex face to the opposite hex face. Waterfowl decoy apparatus 600 is aerodynamically constructed and balanced. Care must be taken when constructing waterfowl decoy apparatus 600 to bore hairpin receiving structures 632(*l*)(1), 632(*l*)(2), 632(*r*), roll pin receiving structures 633, and cotter key receiving structure 634 such that spacing and balance is maintained. If balance is poor, the efficiency of waterfowl decoy apparatus 600** is decreased.

Figure 20:
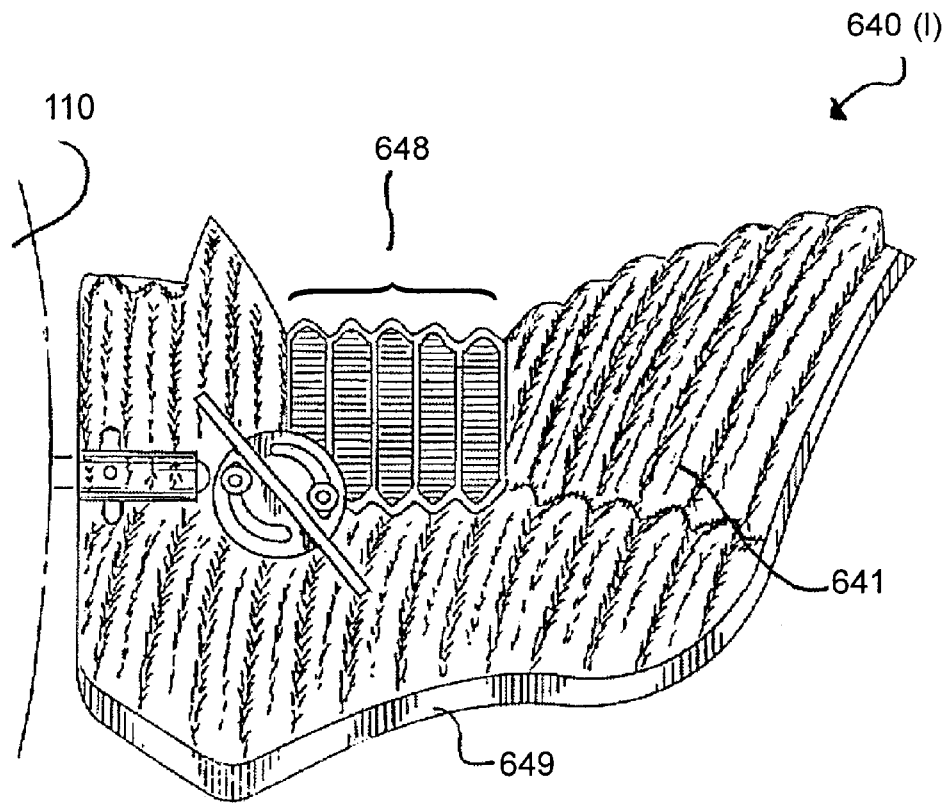
FIG. 20 is a top plan view of one wing of the preferred embodiment of the decoy apparatus.

Wing **640(*l*) and wing 640(*r*) each have laterally-opposed placement relative to wingless imitation waterfowl structure 110. Wing 640(*l*) and wing 640(*r*) each have a dorsal surface 641 and a ventral surface 642. Wing 640(*l*) and wing 640(*r*) have a visually correct anatomical wing shape when viewed from a top plan view as shown in FIG. 19. Wing 640(*l*) and its dorsal surface 641 are shown in FIG. 20. Wing 640(*l*) and its ventral surface 642 are further shown in FIG. 21. Wing 640(*l*) further has proximally-located integrally-formed hexagonal socket 644(*l*) and wing 644(*r*) has proximally-located integrally-formed hexagonal socket 644(*r*) where proximally-located integrally-formed hexagonal socket 644 (*l*) and proximally located integrally formed hexagonal socket 644(*r*) are shown in FIG. 22 and FIG. 26. Proximally located integrally-formed hexagonal socket 644(*r*) has socket hairpin receiving structure 645(*r*), which lies in a plane perpendicular to the plane of wing 640(*r*) as shown in FIG. 26. Proximally located integrally-formed hexagonal socket 644(*l*) has socket hairpin receiving structure 645(*l*), which lies in a plane perpendicular to the plane of wing 640(*l*) as also shown in FIG. 26**

Proximally located integrally-formed hexagonal socket **644(*l*) is slidably engaged and securely fastened to terminal end 631(*l*) of shaft member 630 with a first hairpin 646 being inserted through hairpin receiving structures 632(*l*)(1) such that wing 640(*l*) lies in a plane perpendicular to the plane of socket hairpin receiving structure 645(*l*) and hairpin receiving structure 632(*l*). Proximally located integrally-formed hexagonal socket 644(*r*) is slidably engaged and securely fastened to terminal end 631 (*r*) of shaft member 630** with a second hairpin 646 such that wing 640(*r*) lies in a plane perpendicular to the plane of socket hairpin receiving structure 645(*r*) and hairpin receiving structure 632(*r*).

At the option of the user, first hairpin 646 may be removed from hairpin receiving structure 632(*l*)(1) to release wing 640(*l*) from terminal end 631(*l*). Wing 640(*l*) may then be freely adjusted and slidably re-engaged and securely fastened to shaft member 630 whereby first hairpin 646 fastens wing 640(*l*) to terminal end 631(*l*) by insertion through hairpin receiving structure 632(*l*)(2). In this manner wing 640(*l*) will lie in a plane the angle of which is 60 degrees offset from the plane in which 640(*r*) lies as figuratively shown in FIG. 26 and as demonstrated in FIG. 22 and FIG. 23. Wing 640(*l*) and wing 640(*r*) are thus staggered in orientation and securely fastened to shaft member 630.

Wing 640(*l*) and wing 640(*r*) are thus permitted to co-rotate through 360 degrees in unison together about the axis of rotation extending through the long axis of shaft member 630. From extreme lateral viewpoints, both dorsally-located rotor blade members 650(*d*) and both ventrally-located rotor blade members 650(*v*) can be easily viewed, thus further contributing to the alluring effect of waterfowl decoy apparatus 600 at the option of the user. Additionally, the staggered orientation of wings 640(*l*) and 640(*r*) allows dorsally-located rotor blade members 650(*d*) and ventrally-located rotor blade members 650(*v*) to collect additional kinetic wind energy, particularly kinetic wind energy being directed against dorsally-located rotor blade members 650(*d*) and ventrally-located rotor blade members 650(*v*) from extreme lateral locations. The increased kinetic wind energy collection capability thus also increases the efficiency of waterfowl decoy apparatus 600.

Wing 640(*l*) and wing 640(*r*) each further comprise a dorsally located visual identifying pattern 648 as shown in FIG. 19 and FIG. 20. Dorsally located visual identifying pattern 648 includes species-specific variable coloration depending on the waterfowl species sought to be allured. Wing 640(*l*) and wing 640(*r*) each further comprise a wing length visual feather outline 649, which is located along the anterior edge of wing 640(*l*) and 640(*r*) as shown in FIG. 19. Wing length visual feather outline 649 has species specific variable coloration depending on the waterfowl species sought to be allured.

Figure 30:
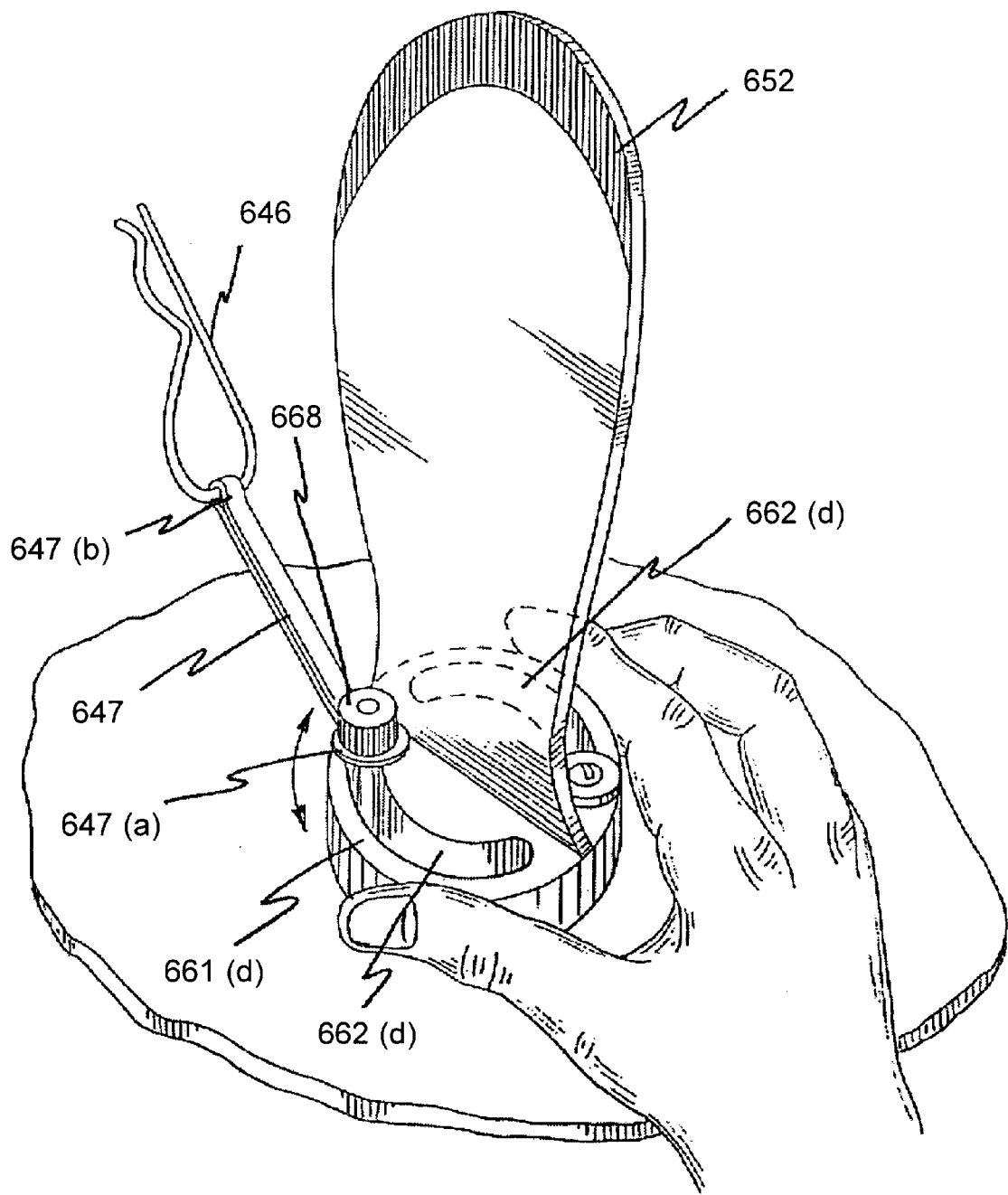
FIG. 30 is a fragmentary perspective view of the manner of use of a portion of one pitch control assembly.
Figure 31:
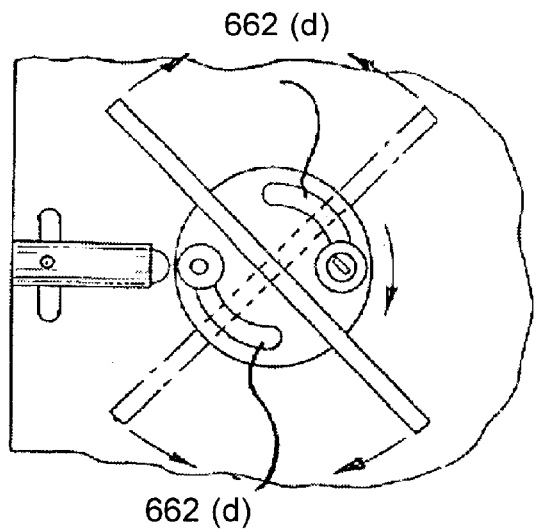
FIG. 31 is a fragmentary top plan view one pitch control assembly at one extreme pitchset.
Figure 32:
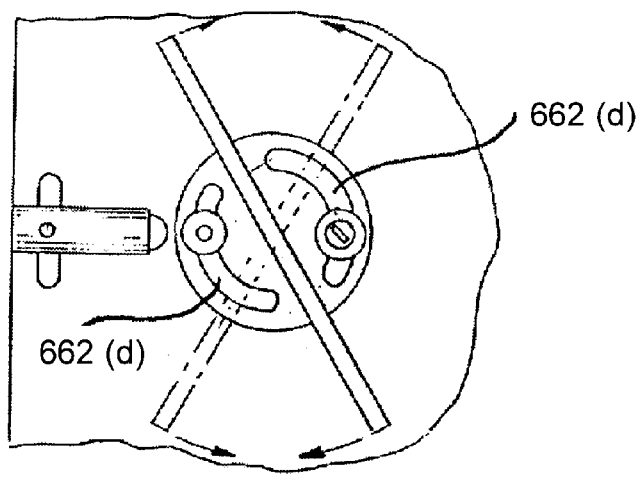
FIG. 32 is a fragmentary top plan view of the pitch control assembly in FIG. 31 at an intermediate pitch-set.
Figure 33:
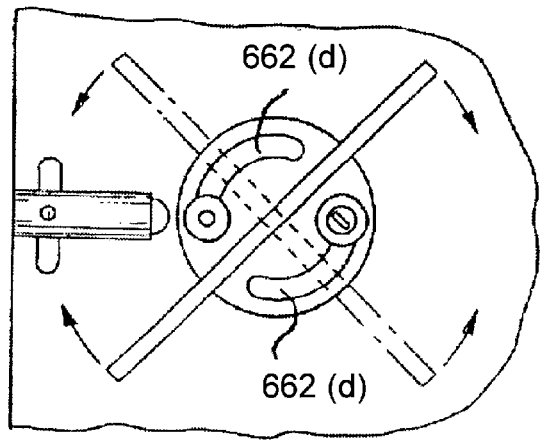
FIG. 33 is a fragmentary top plan view of the pitch control assembly in FIG. 31 at the opposite extreme pitch-set.

Wing 640(*l*) and wing 640(*r*) each have one dorsally-located rotor blade member 650(*d*) as shown in FIG. 18, FIG. 22 and FIG. 23 and one ventrally-located rotor blade member 650(*v*) as shown in FIG. 22 and are made of a lightweight, rigid, durable, moldable material such as plastic. Dorsally-located rotor blade members 650(*d*) and ventrally-located rotor blade members 650(*v*) are adjustably mounted on wing 640(*l*) and wing 640(*r*) as shown in FIG. 22 and FIG. 30 for collecting kinetic wind energy.

Dorsally located rotor blade members 650(*d*) and ventrally located rotor blade members 650(*v*) collect and convert kinetic wind energy to rotational power in shaft member 630. When converted to rotational power, kinetic wind energy causes wing 640(*l*) and wing 640(*r*), hexagonal shaft member 630 and dorsally located rotor blade members 650(*d*) and ventrally-located rotor blade members 650(*v*) to rotate in unison relative to wingless imitation waterfowl structure 110. Dorsally-located rotor blade members 650(*d*) and ventrally-located rotor blade members 650(*v*) rotate 360 degrees in unison with wing 640(*l*) and wing 640(*r*) in a clockwise direction or in a counter-clockwise direction relative to wingless imitation waterfowl structure 110 depending on the kinetic wind energy being directed against dorsally-located rotor blade members 650(*d*) and ventrally-located rotor blade members 650(*v*). Dorsally-located rotor blade members 650(*d*) and ventrally-located rotor blade members 650(*v*) thus create wing movement for alluring waterfowl located laterally, longitudinally and vertically relative to waterfowl decoy apparatus 600. Waterfowl decoy apparatus 600 is aerodynamically constructed and balanced. Care must be taken when constructing waterfowl decoy apparatus 600 to craft wing 640(*l*), wing 640(*r*), dorsally-located rotor blade members 650(*d*), ventrally-located rotor blade members 650(*v*), and pitch control assemblies 660 such that weight distribution on the left side matches the weight distribution on the right side. If balance is poor, efficiency of waterfowl decoy apparatus 600 is decreased.

When kinetic wind energy is absent, dorsally located rotor blade members 650(*d*) and ventrally located rotor blade members 650(*v*) are rotatably resting. Dorsally-located rotor blade members 650(*d*) and ventrally-located rotor blade members 650(*v*) are weighted so as to allow wing 640(*l*) and wing 640(*r*) to rest with ventral surface 642 facing substantially down as shown in FIG. 22 and FIG. 23. Additionally, dorsally located rotor blade members 650(*d*) rest substantially dorsally and ventrally-located rotor blade members 650(*v*) rest substantially ventrally as shown in FIG. 22 and FIG. 23.

Dorsally located rotor blade members 650(*d*) each have distal edge coloration 652 as shown in FIG. 22 and 23. Distal edge coloration 652 is variable depending on the waterfowl species sought to be allured. Ventrally located rotor blade members 650(*v*) each have distal edge coloration 652 as shown in FIG. 18. Proximal edge coloration 653 is variable depending on the waterfowl species sought to be allured. When kinetic wind energy is present, dorsally-located rotor blade members 650(*d*) and ventrally-located rotor blade members 650(*v*) rotate 360 degrees in unison with wing 640(*l*) and 640(*r*) in a clockwise direction or in a counter-clockwise direction relative to wingless imitation waterfowl structure 110 depending on the kinetic wind energy being directed against dorsally-located rotor blade members 650(*d*) and ventrally-located rotor blade members 650(*v*).

Dorsally-located rotor blade members 650(*d*) and ventrally-located rotor blade members 650(*v*) are adjustably mounted onto wing 640(*l*) and wing 640(*r*) by a pitch control assembly 660 as shown in FIG. 22 and FIG. 27 and FIGS. 29-33. Pitch control assembly 660 allows for setting the pitch of dorsally-located rotor blade members 650(*d*) and ventrally-located rotor blade members 650(*v*) enabling each dorsally-located rotor blade member 650(*d*) and each ventrally-located rotor blade member 650(*v*) to be positioned in a preset orientation with respect to wing 640(*l*) and wing 640(*r*) to collect and convert kinetic wind energy at varying rates as desired by the user. The user may adjust for the maximum available collection of kinetic wind energy when kinetic wind energy is low and may adjust for the minimum available collection of kinetic wind energy when kinetic wind energy is high to achieve the most efficient RPM rotational value of wings 640(*l*) and 640(*r*), dorsally-located rotor blade members 650(*d*) and ventrally-located rotor blade members 650(*v*) according to the field conditions or availability of kinetic wind energy where waterfowl decoy apparatus 600 is set-up for decoy attraction purposes.

Figure 27:
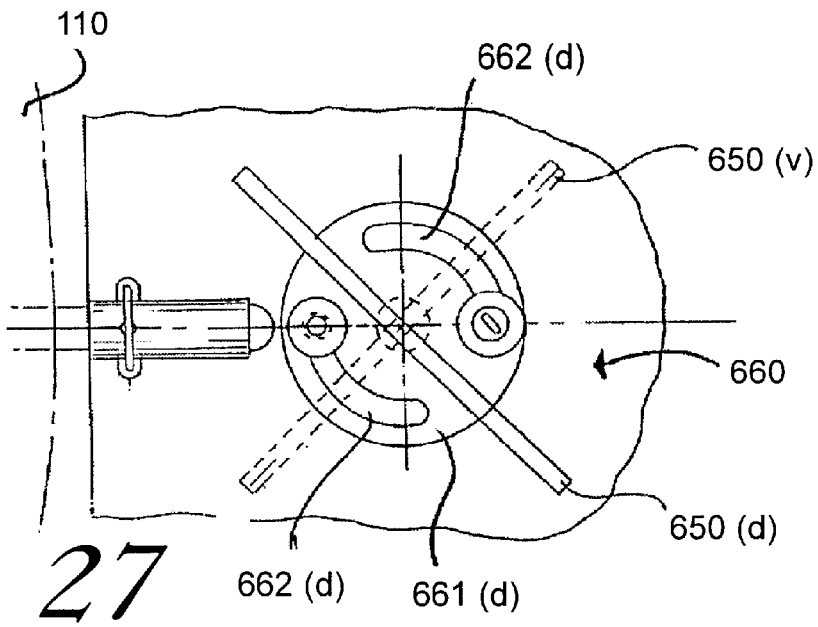
FIG. 27 is a fragmentary bottom plan view of one pitch control assembly.
Figure 29:
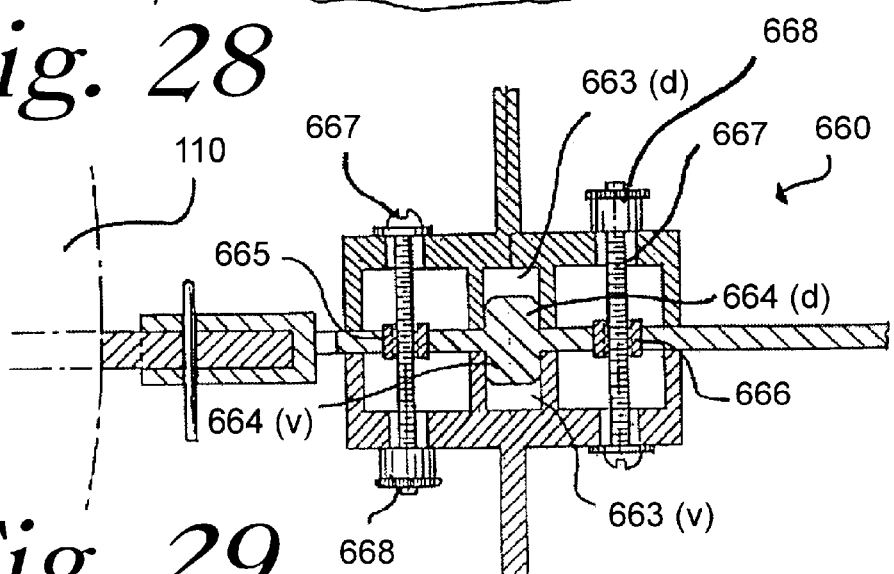
FIG. 29 is a cross-sectional front view of the pitch control assembly of FIG. 27.

Pitch control assembly 660 is comprised of a dorsal grooved pitch control structure 661 (*d*) integrally formed with the proximal end of each dorsally-located rotor blade member 650(*d*) and a ventral grooved pitch control structure 661(*v*) integrally formed with the proximal end of each ventrally-located rotor blade member 650(*v*) as shown in FIG. 23 and dorsal grooved pitch control structure 661(*d*) is shown in FIG. 29 and FIG. 30. Dorsal grooved pitch control structures 661(*d*) are preferably circular in shape as shown in FIG. 27 and FIG. 30. Each dorsal grooved pitch control structure 661(*d*) has two arc-shaped guide groove apertures 662(*d*) located opposite one another as shown in FIG. 27 and as further shown in FIGS. 30-33. One arc-shaped groove aperture 662(*d*) is substantially proximal to wingless imitation waterfowl structure 110, and the other arc-shaped groove aperture 662(*d*) is substantially lateral to wingless imitation waterfowl structure 110 as shown in FIG. 27. The terminal ends of each arc-shaped guide groove apertures 662(*d*), when connected with an imaginary line, forms an imaginary line which lies in a plane substantially parallel to the plane in which dorsally-located rotor blade member 650(*d*) lies.

Figure 21:
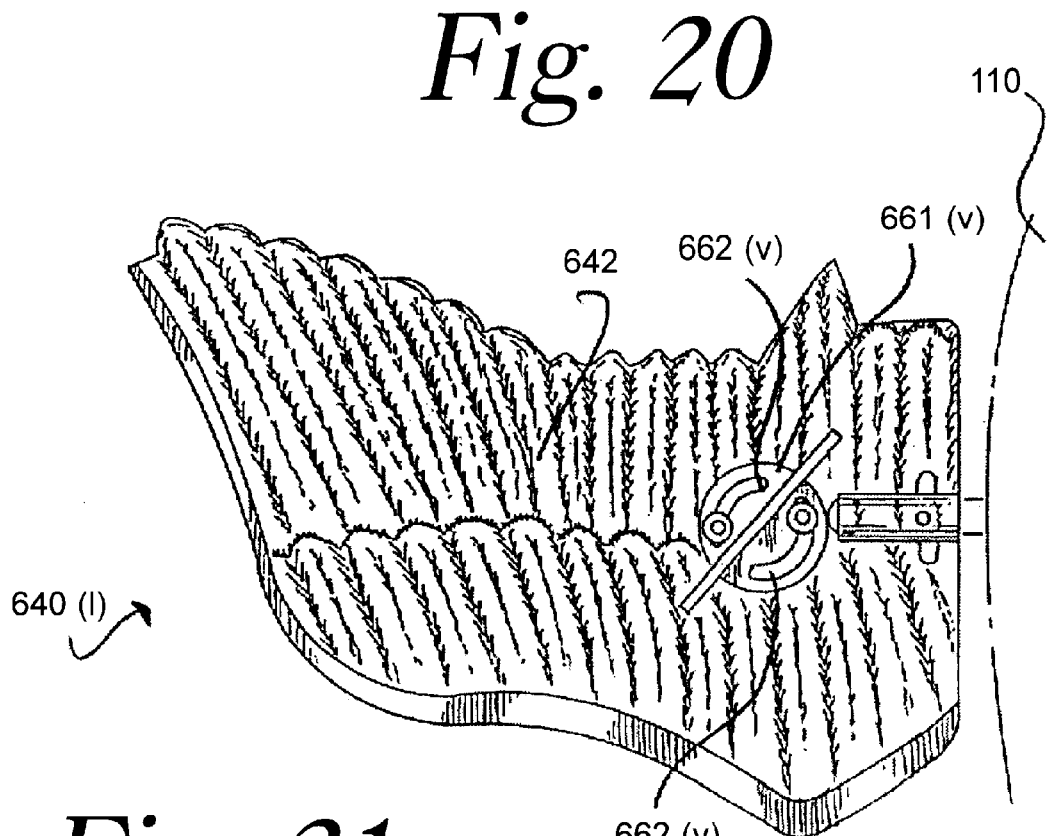
FIG. 21 is a bottom plan view of the wing shown in FIG. 19.

Ventral grooved pitch control structures 661(*v*) are also preferably circular in shape. Ventral grooved pitch control structures 661(*v*) each have two arc-shaped guide groove apertures 662(*v*) located opposite one another as shown in FIG. 21. One arc-shaped groove aperture 662(*v*) is substantially proximal to wingless imitation waterfowl structure 110, and the other arc-shaped groove aperture 662(*v*) is substantially lateral to wingless imitation waterfowl structure 110. The terminal ends of each arc-shaped guide groove aperture 662(*v*), when connected with an imaginary line, forms an imaginary line which lies in a plane substantially parallel to the plane in which ventrally-located rotor blade member 650(*v*) lies.

Dorsal grooved pitch control structure 661 (*d*) further comprises a hollow cylindrical guide socket 663(*d*) as shown in FIG. 29. The center longitudinal axis of hollow cylindrical guide socket 663(*d*) lies in the same plane as dorsally located rotor blade member 650(*d*). Ventral grooved pitch control structure 661 (*v*) each further comprises a hollow cylindrical guide socket 663(*v*) as shown in FIG. 29. The center longitudinal axis of hollow cylindrical guide socket 663(*v*) lies in a plane parallel with the plane in which lies ventrally-located rotor blade member 650(*v*).

Figure 28:
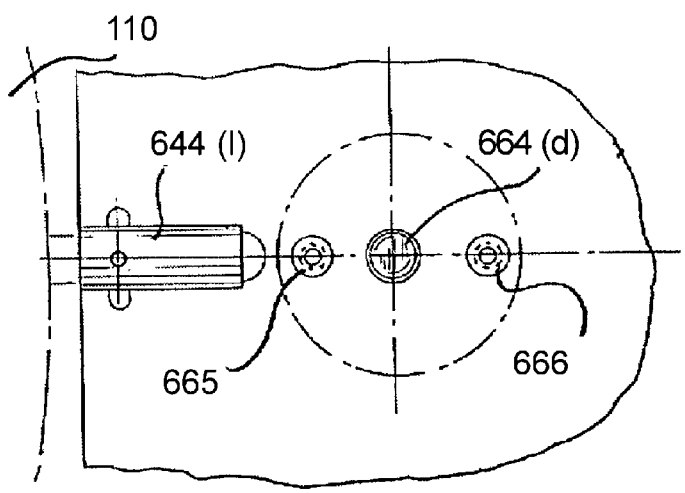
FIG. 28 is a fragmentary bottom plane view of the wing with the pitch control assembly of FIG. 27 removed.

Wing 640(*l*) and wing 640(*r*) each have integrally formed therewith a dorsally-located cylindrical guide boss 664(*d*) and a ventrally-located cylindrical guide boss 664(*v*) as shown in FIG. 28 and FIG. 29. Dorsally located cylindrical guide boss 664(*d*) and ventrally located cylindrical guide boss 664(*v*) are located laterally from proximally located integrally formed hexagonal sockets 644(*l*) and 644(*r*). Dorsally-located cylindrical guide boss 664(*d*) and ventrally-located cylindrical guide boss 664(*v*) have a common longitudinal axis extending therethrough and are integrally formed dorsally/ventrally opposite one another on wing 640(*l*) and wing 640(*r*).

Wing 640(*l*) and wing 640(*r*) each have two guide apertures extending through the wing structure as shown in FIG. 28 and FIG. 29. In this regard, wing 640(*l*) and wing 640(*r*) each have one medial guide aperture 665 and one lateral guide aperture 666. Medial guide apertures 665 are located laterally from proximally located integrally-formed sockets 144(*l*) and 144(*r*), but proximal to dorsally-located cylindrical guide boss 664(*d*) and ventrally-located cylindrical guide boss 664(*v*) as shown in FIG. 28 and FIG. 29. Lateral guide apertures 666 are located laterally from dorsally located cylindrical guide boss 664(*d*) and ventrally located cylindrical guide boss 664(*v*) as shown in FIG. 28 and FIG. 29.

Dorsal grooved pitch control structures 661(*d*) and ventral grooved pitch control structures 661(*v*) adjustably mount dorsally-located rotor blade members 650(*d*) and ventrally-located rotor blade members 650(*v*) to wing 640(*l*) and wing 640(*r*) by placing hollow cylindrical guide sockets 663(*d*) over dorsally-located cylindrical guide bosses 664(*d*) and by placing hollow cylindrical guide sockets 663(*v*) over ventrally-located cylindrical guide bosses 664(*v*) as shown in FIG. 29.

Two, preferably nylon, screws 667 or similar fastening structures selectively fasten dorsal grooved pitch control structures 661(*d*) and ventral grooved pitch control structures 661(*v*) to wing 640(*l*) and wing 640(*r*). This procedure is initiated by dorsally inserting one screw 667 through each arc-shaped groove aperture 662(*d*) spatially located substantially proximal to wingless imitation waterfowl structure 110, through medial guide apertures 665 and through arc-shaped groove apertures 662(*v*) spatially located substantially proximal to wingless imitation waterfowl structure 110. These screws 667 are releasably secured by thumbscrews 668 or similar fastening nut structure as shown in FIG. 29. One screw 667 is then ventrally inserted through each arc-shaped groove aperture 662(*v*) spatially located substantially lateral to wingless imitation waterfowl structure 110, through lateral guide apertures 666 and through arc-shaped groove apertures 662(*d*) spatially located substantially lateral to wingless imitation waterfowl structure 110. These screws 667 are releasably secured by thumbscrews 668 or similar fastening nut structure also as shown in FIG. 29.

First hairpin 646 may be separately fastened to waterfowl decoy apparatus 600 to prevent loss thereof by including a tie structure 647 as illustrated in FIG. 30 for demonstration purposes. Tie structure 647 has one screw receiving end 647(*a*) and one hairpin receiving end 647(*b*). Screw receiving end 647(*a*) is preferably placed on screw 667 terminating ventrally on wing 640(*l*) before a thumbscrew 668 is releasably secured thereon. Hairpin receiving end 647(*b*) receives first hairpin 646 and acts as a tether to prevent first hairpin 646 from being accidentally dropped and lost.

By manually releasing thumbscrews 668, manually turning dorsally located rotor blade members 650(*d*) and ventrally located rotor blade members 650(*v*) to a desired pitch through use of the pitch control assembly 660. As demonstrated in FIG. 30 and as further shown in FIGS. 31–33, the user is enabled to set the pitch of dorsally-located rotor blade members 650(*d*) and ventrally-located rotor blade members 650(*v*) in a selected orientation with respect to wing 640(*l*) and wing 640(*r*) to collect and convert kinetic wind energy at varying rates as desired by the user in an effort to adjust for the maximum available collection of kinetic wind energy when kinetic wind energy is low and may adjust for the minimum available collection of kinetic wind energy when kinetic wind energy is high to achieve the most efficient RPM rotational value of wings 640(*l*) and 640(*r*), dorsally-located rotor blade members 650(*d*) and ventrally-located rotor blade members 650(*v*) according to the field conditions or availability of kinetic wind energy where waterfowl decoy apparatus 600 is set-up for decoy attraction purposes.

Dorsally-located rotor blade members 650(*d*) and ventrally-located rotor blade members 650(*v*) thus create staggered wing movement in wing 640(*l*) and wing 640(*r*) primarily from longitudinal and vertical viewpoints as shown from one extreme longitudinal viewpoint in FIG. 22. This occurs through a combination of both the physical rotational movement of wing 640(*l*) and wing 640(*r*) and the alternating visual illusion created by alternating light-absorbent dorsal surface coloration 646 and light-reflective ventral surface coloration 647 as wing 640(*l*) and wing 640(r) turn about the axis of rotation extending through the long axis of hexagonal shaft member 630.

Dorsally-located rotor blade members 650(d) and ventrally-located rotor blade members 650(v) thus also create staggered wing movement in dorsally-located rotor blade members 650(d) and ventrally-located rotor blade members 650(v) primarily from lateral viewpoints as shown from one extreme lateral viewpoint in FIG. 23. This occurs through a combination of the physical rotational movement of dorsally-located rotor blade members 650(d) and ventrally-located rotor blade members 650(v) and the alternating visual illusion created by alternating light-absorbent dorsal blade coloration 157 and light-reflective ventral blade coloration 158 as dorsally-located rotor blade members 650(d) and offset ventrally-located rotor blade members 650(v) turn about the axis of rotation extending through the long axis of hexagonal shaft member 630.

SWIVEL MOUNTING SYSTEM

Figure 16:
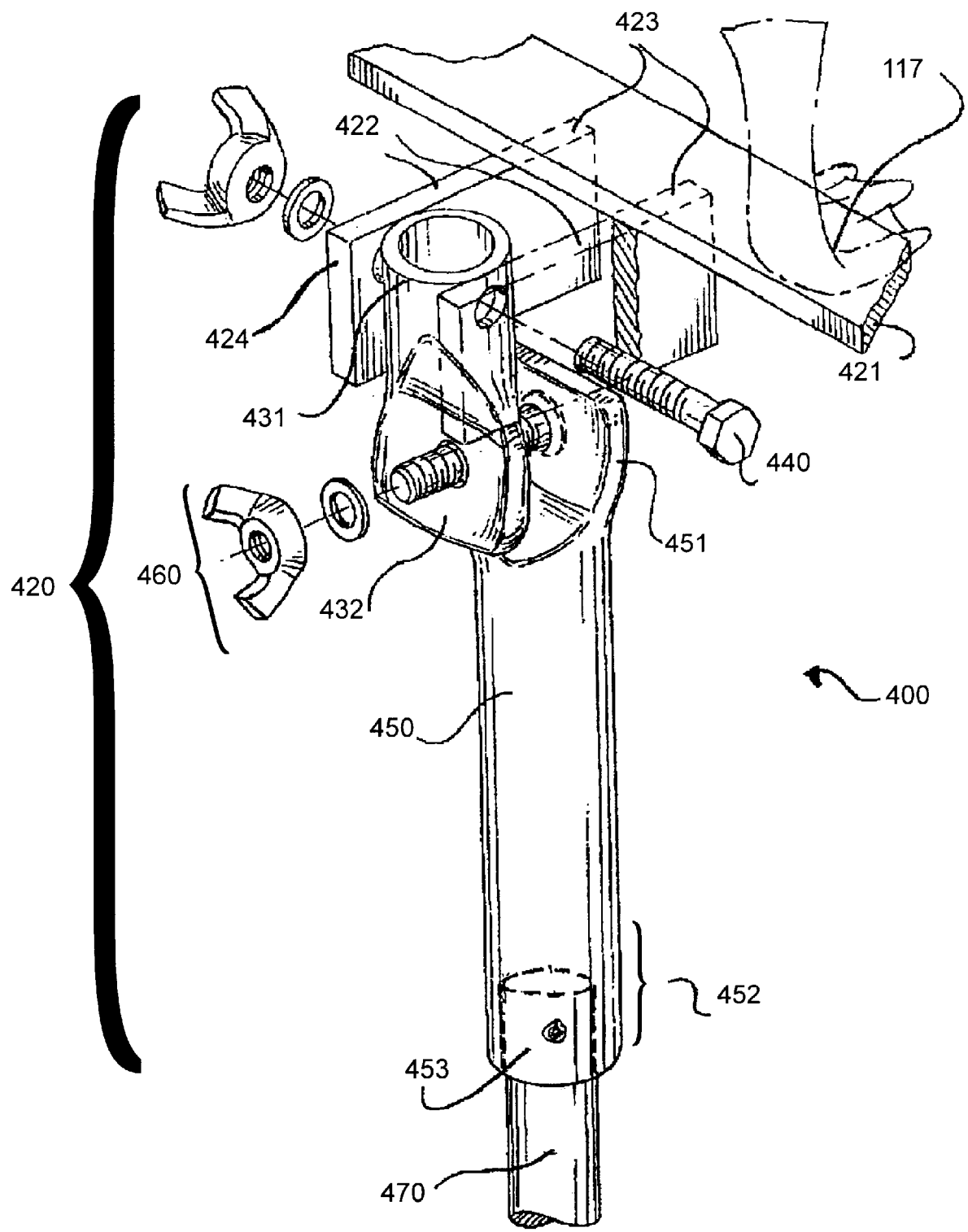
FIG. 16 is an enlarged exploded view of the swivel mount assembly.

In an effort to improve upon the effectiveness of waterfowl decoy apparatus 100, waterfowl decoy apparatus 200 and waterfowl decoy apparatus 300 a swivel mounting system 400 therefor is also disclosed and illustrated in FIG. 16. Swivel mounting system 400 is fixedly attached to rigid foot members 117(l) and 11 7(r) where rigid foot member 117(r) is shown in FIG. 16 and rigid foot member 117(l) is shown in FIG. 7. Swivel mounting systems 400 allows waterfowl decoy apparatus 100, waterfowl decoy apparatus 200 and waterfowl decoy apparatus 300 to have 360 degrees of rotation about a vertical axis of rotation. A swivel mount assembly 420 and an upright elongate rod member 470 further define swivel-mounting system 400.

Swivel mount assembly 420 comprises a rigid crossbeam member 421 made of a rigid durable material such as metal and is fastened to rigid foot members 117(l) and 117(r). A pair of rigid parallel struts 422 made of rigid durable material such as metal is integrally attached to rigid cross beam member 421. Rigid parallel struts 422 each have a strut support 423 end and a strut attachment end 424. Strut support ends 423 are each integrally formed with rigid cross beam member 421.

Swivel mount assembly 420 further comprises a top upright cylinder member portion 430 as shown in FIG. 7, FIG. 12 and FIG. 16. Top upright cylinder member portion 430 is made of rigid durable material such as metal and has an upper cylinder end 431 and a distal top portion end 432 as shown in FIG. 16. A selectively-operable laterally-aligned bolt assembly 440 fastens strut attachment ends 424 to upper cylinder end 431 thus creating a longitudinally-aligned hinge joint allowing monoaxial movement about a laterally-aligned horizontal axis of rotation running through the long axis of selectively-operable laterally aligned bolt assembly 440. Strut attachment ends 424 and upper cylinder end 431 must be laterally bored or drilled to receive selectively operable laterally aligned bolt assembly 440.

Distal top portion end 432 has a flattened distally located cylinder structure. The flattened distally located cylinder structure may be flattened by flat-pressing distal top portion end 432.

Swivel mount assembly 420 further comprises a bottom upright cylinder member portion 450 as shown in FIG. 7, FIG. 12 and FIG. 16. Bottom upright cylinder member portion 450 is made of rigid durable material such as metal and has a proximal bottom portion end 451 and a lower cylinder end 452 as shown in FIG. 16. Proximal bottom portion end 451 has flattened proximally located cylinder structure. The flattened proximally located cylinder structure can be achieved by flat-pressing proximal bottom portion end 451.

As further shown in FIG. 16, a selectively operable longitudinally-aligned bolt assembly 460 fastens distal top portion end 432 to proximal bottom portion end 451 thus creating a laterally-aligned hinge joint. The laterally aligned hinge joint allows for 360 degrees of rotational movement about a longitudinally aligned horizontal axis of rotation extending through longitudinally aligned bolt assembly 460. The flattened distally-located cylinder structure of distal top portion end 432 and the flattened proximally-located cylinder structure of proximal bottom portion end 451 must first be longitudinally bored or drilled to receive selectively-operable longitudinally-aligned bolt assembly 460. Lower cylinder end 452 end has an inner cylinder surface defining a hollow cylindrical socket 453.

Upright elongate rod member 470 is made of a rigid durable material such as metal, wood or plastic and is illustrated in FIG. 7. Upright elongate rod member 470 further comprises an upper support end 471 and a lower anchor end 472 opposite upper support end 471. Upright elongate rod member 470 is selectively fixed in a substantially vertical position. A vertical axis of rotation extends through the long axis of upright elongate rod member 470. Upper support end 471 is slidably and rotatably received in hollow cylindrical socket 453 allowing for 360 degrees of rotational movement about the vertical axis of rotation. Lower anchor end 472 has a pointed terminus 473 for piercedly and fixedly anchoring upright elongate rod member 470 in the earth. Pointed terminus 473 may also piercedly and fixedly anchor upright elongate rod member 470 in watercovered earth. When upright elongate rod member 470 is fixedly anchored in water-covered earth, upright elongate rod member 470 has sufficient length for elevating lower cylinder end 452 above the water surface.

OPTIONAL MOTOR ASSEMBLY

Figure 17:
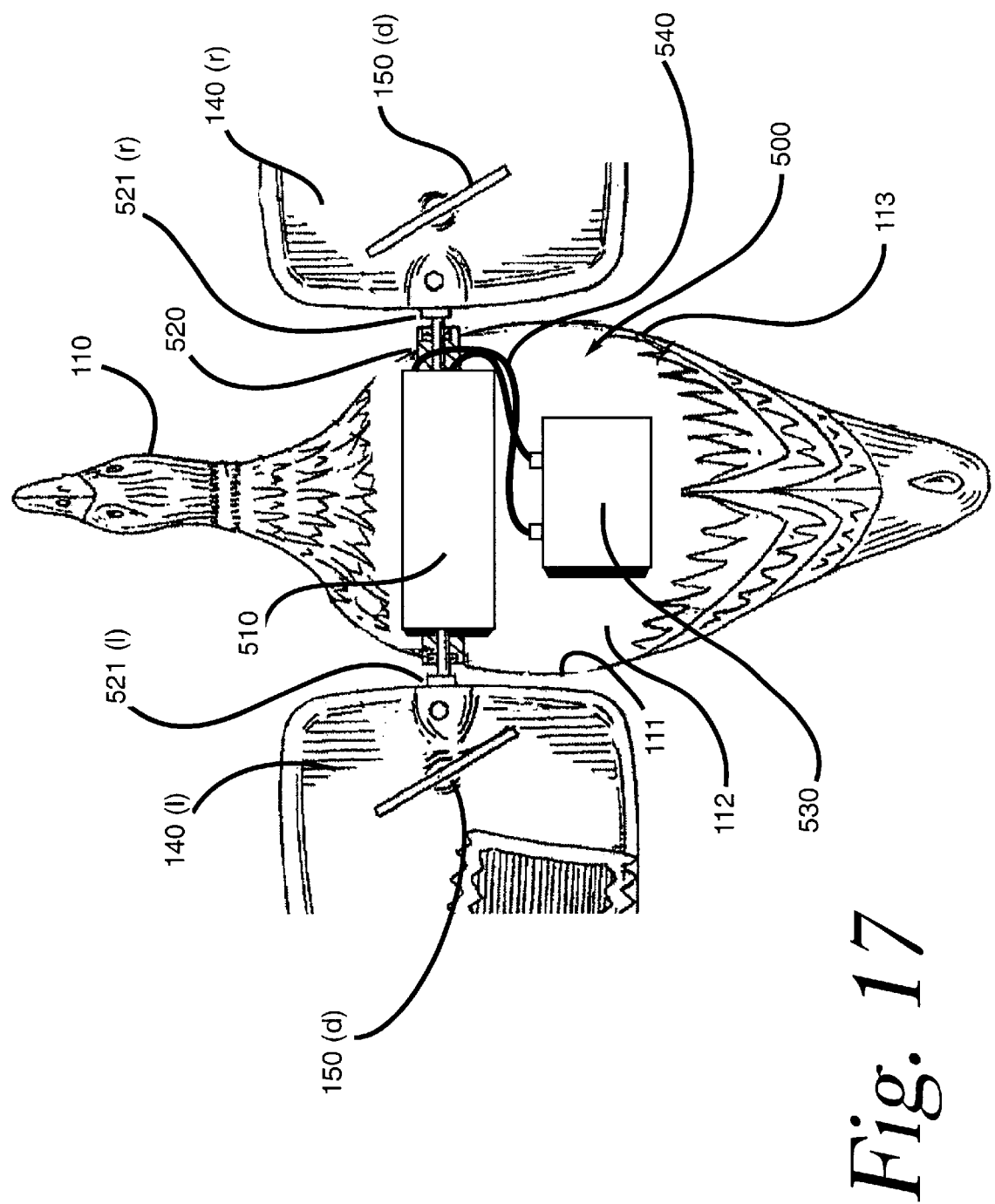
FIG. 17 is a fragmentary top plan view of the first alternative embodiment of the decoy apparatus with parts broken away to show optional motor assembly configuration.

An optional motor assembly 500 for use in generating rotational power in a motor-engaging shaft member 520 when wind energy is absent is illustrated in FIG. 17. Optional motor assembly 500 comprises a motor 510, motor-engaging shaft member 520 rotatably engaged by motor 510, a battery supply 530 and a circuit 540 for transferring stored battery power to motor 510.

Motor 510 lies within interior body chamber 112 and generates rotational power to rotatably drive motor-engaging shaft member 520 in a clockwise direction or in a counter-clockwise direction relative to wingless imitation waterfowl structure 110. The user may selectively choose the rotational direction.

Motor-engaging shaft-member 520 has laterally-opposed, motor-driven shaft terminal ends 521(l) and 521(r). Motor-driven shaft terminal ends 521(l) and 521(r) each rotatably extend through inner surface 111 at laterally-opposed interior points of interior body chamber 112 posterior to the points where shaft housing ends 121(l) and 121(r) extend through inner surface 111. Motor-driven shaft terminal ends 521(l) and 521(r) each rotatably extend through outer surface 113 at laterally-opposed exterior points of wingless waterfowl 114 posterior to the points where shaft housing ends 121(l) and 121(r) extend through outer surface 113. Motor-engaging shaft member 520 has an axis of rotation extending through its long axis.

Users may detach wing 140(l) from terminal end 131(l) and wing 140(r) from terminal end 131(r) by releasing fastening member structures 145. Wing 140(*l*) may then be reattached to motor-driven shaft terminal end 521(*l*) and wing 140(*r*) may then be reattached to motor-driven shaft terminal end 521(*r*). When attached to motor-engaging shaft member 520, wing 140(*l*) and 140(*r*) are permitted to rotate through 360 degrees in a clockwise or counter-clock-wise direction relative to wingless imitation waterfowl structure 110 depending on the selected motor-created rotational power in motor-engaging shaft member 520.

Battery supply 530 lies within interior body chamber 112 posterior to motor 510 and stores electrochemical power having sufficient voltage to run motor 510. Circuit 540 connects battery supply 530 to motor 510 and is open at the election of the user. When circuit 540 is closed at the election of the user, amperage is delivered to drive motor 510 creating rotational power in motor-engaging shaft member 520 further creating wing movement in wing 140(*l*) and wind 140(*r*) primarily from longitudinal and vertical viewpoints. This occurs through a combination of both the physical rotational movement of wing 140(*l*) and wing 140(*r*) and the alternating visual illusion created by alternating light-absorbent dorsal surface coloration 146 and light-reflective ventral surface coloration 147 as wing 140(*l*) and wing 140(*r*) turn about the axis of rotation extending through the long axis of motor-engaging shaft member 520.

Motor-created rotational power in motor engaging shaft member 520 thus also creates wing movement in dorsally located rotor blade members 150(*d*) and ventrally located rotor blade members 150(*v*) primarily from lateral viewpoints. This occurs through a combination of both the physical rotational movement of dorsally-located rotor blade members 150(*d*) and ventrally-located rotor blade members 150(*v*) and the alternating visual illusion created by alternating light-absorbent dorsal surface coloration 157 and light-reflective ventral surface coloration 158 as dorsally-located rotor blade members 150(*d*) and ventrally-located rotor blade members 150(*v*) turn about the axis of rotation extending through the long axis of motor-engaging shaft member 520.

Optional motor assembly 500 is herein disclosed with an eye toward accommodating those users who may prefer motorized systems for decoy animation, despite our recognition that motorized systems for animation tend to be detrimental to the environment, tend to have limited effectiveness and tend to wear more quickly. Moreover, optional motor assembly 500 may or may not be an option available in some areas based on local, state and/or federal governmental agency law.

The reader will see that the preferred waterfowl decoy apparatus herein described provides a decoy apparatus with a visually imitative decoy body structure, a visually imitative decoy wing structure, and an integral wing to body configuration. These features serve to enhance decoy apparatus effectiveness. The reader will further see that the preferred waterfowl decoy apparatus herein described provides an efficient yet environmentally safe means to animate a decoy apparatus, namely by harnessing wind energy, so that the range of waterfowl decoy attraction is expanded to a maximum extent. Additionally, the present swivel mounting system allows the user to simulate the myriad bodily movements of which waterfowl are capable.

While our above description contains much specificity, these should not be construed as limitations on the scope of the invention, but rather as an exemplification of the invention. For example, the wingless imitation waterfowl structure need not be made of plastic. The composite material is not critical to the function of the wingless imitation waterfowl structure. So long as the composite material is capable of receiving and structurally supporting the transversely disposed shaft housing, the shaft member received in the shaft housing, the wings and rotor blade members as assembled, the wingless imitation waterfowl structure fulfills its supportive function. A plastic wingless imitation waterfowl structure preferably provides this function in that it can be molded at low cost. Further, the wingless imitation waterfowl structure need not resemble the waterfowl species illustrated herein, but may resemble any suitable bird species.

The shaft housing need not be made of metal, wood or plastic. The shaft housing provides rotatable support for the shaft member rotatably received therein. Plastic material for the shaft housing preferably provides this function in that it is lightweight and less costly but provides necessary rigid support. The shaft housing may be further eliminated so long as the transversely disposed shaft member may be rotatably operable through the body of the wingless imitation waterfowl structure, and the wings and rotor blade members are allowed to turn about the axis of rotation. The waterfowl decoy apparatus may still allure universally located waterfowl through the operation of its rotatable wings and rotor blade members. When included, however, the shaft housing preferably provides this function in that the inner surface walls of the wingless imitation waterfowl structure need not be reinforced to support the weight of the shaft member, wings and rotor blade members as assembled.

The shaft member need not be made of metal, wood or plastic. Any material may be used which is capable of providing a rigidly supportive common axis of rotation for the wings and rotor blade members so that the wings and rotor blade members may turn in unison about the axis of rotation. The common axis of rotation requires a great deal of rigid strength and the composite material must be capable of providing a sturdy common axis of rotation. Metal shaft members preferably provide this function. Where metal is used, stainless steel stock is preferable in that rust, and the attendant wear caused therefrom, may be avoided.

Further, the shaft member need not be hexagonal shaped and the bearing members need not have hexagonal shaft receiving structure. A hexagonal shaft is preferred in that the wings may be offset one hex face as desired. The plane in which the offset wing lies will always be 60 degrees offset from the plane in which the second wing lies. This consistent offset is preferable in that rotational balance can be maintained more efficiently.

The wings need not be made of plastic. The wings provide a visual effect upon rotation and therefore any lightweight, durable, moldable material may be used so long as the wings may freely rotate and provide the visual effect upon rotation. Further the wings need not be limited to the shapes illustrated herein, but may take on any suitable wing shape respectively associated with the imitative bird species of the wingless imitation waterfowl structure.

Further, the wings may be illustrated by placing pre-printed decals thereon, or they may be hand-painted, silk-screen printed, or etched and painted, as the customer may desire. If etched, the wings should be etched in the same fashion for both wings to avoid one wing becoming weightier than the other, thus creating imbalance therebetween and decreasing rotational efficiency.

The rotor blade members need not be made of plastic. The rotor blade members collect wind energy and transfer the wind energy to the shaft member for rotation about the axis of rotation. Composite materials capable of providing this function are suitable. Plastic rotor blade members preferably provide this function in that they may be integrally molded with the wings. However, the rotor blade members need not be integrally formed with the wings so long as the rotor blade members collect wind energy and convert the wind energy to rotational power in the shaft member while simultaneously creating a visual effect from lateral viewpoints. Rotor blade members integrally formed with the wings preferably provide this function. Further, the rotor blade members need not be propeller-shaped to simultaneously collect wind energy and create the visual appearance of wing movement from lateral viewpoints. Wing-shaped rotor blade members may also collect wind energy and create visual appearance of wing movement from lateral viewpoints. Propeller-shaped rotor-blade members preferably provide this function in that they are more efficient at collecting wind energy. Additionally, the Savonius wind machine configuration herein described need not have anteriad ventral curvature and posteriad dorsal curvature for increased wind collection capability in one rotational direction, but may also have anteriad dorsal curvature and posteriad ventral curvature for increased wind collection capability in the opposite rotational direction.

It is not critical that shaft member 630 of the preferred embodiment have hairpin receiving structures **632(*l*)(1), 632(*l*)(2), 632(*r*) oriented such that 632(*l*)(1) and 632(*l*)(2) are located on the left hand side of the bird. Should the manufacturer or customer desire a decoy with a right-handed wing offset scheme, the hairpin receiving structures 632(*l*) (1), 632(*l*)(2), 632(*r*), roll pin receiving structures 633, cotter key receiving structures and corresponding hairpins, roll pins and cotter key structures may be reversed or mirrored to effect a right handed offset scheme. If this is desired the tie structure 647 should be mounted on wing 640(*r*) instead of on wing 640(*l*)** to prevent loss thereof.

The rigid crossbeam member of the swivel mount assembly need not made of metal. The crossbeam member provides fixed support for the waterfowl decoy apparatus. A metal crossbeam member preferably provides this function. The rigid parallel struts of the swivel mount assembly need not be made of metal. The rigid parallel struts provide rigid support for the crossbeam member and hinged support for the longitudinally aligned hinge joint. Metal parallel struts preferably provide this function. The upright rigid cylinder member of the swivel mount assembly need not be made of metal. The upright rigid cylinder member provides rotatable support for the swivel mount assembly. A metal upright rigid cylinder member preferably provides this function. The upright elongate rod member need not be made of wood or metal. The upright elongate provides elevated rigid support for the swivel mount assembly and a pointed terminus for anchoring attachment to the ground. A wood or metal upright elongate rod member preferably provides these functions.

Further, the swivel mount assembly need not comprise two opposite-aligned monoaxial hinge joints in combination with one rotational joint. A swivel mount assembly allowing for triaxial movement provides this level of selective orientation. Two opposite-aligned monoaxial hinge joints in combination with one rotational joint preferably provide this function in that the selective orientation can be achieved at minimal cost.

It is foreseen that the concepts herein described may be extended and applied to decoy apparatuses for attracting birds of all species. The bird species herein illustrated and described is used primarily for descriptive and illustrative purposes and should not be construed to limit the scope of concept application to the species shown. Accordingly, although the invention has been described by reference to some embodiments it is not intended that the novel device be limited thereby, but that modifications thereof are intended to be included as falling within the broad scope and spirit of the foregoing disclosure, the following claims and the appended drawings.

We claim:
1. A decoy apparatus for alluring universally-located birds comprising:
   a wingless imitation bird structure, the wingless imitation bird structure further comprising:
      an inner surface, the inner surface defining an interior body chamber;
      an outer surface, the outer surface anatomically configured to resemble a wingless bird structure, the wingless bird structure having bird-simulating markings;
   a shaft housing, the shaft housing having two laterally-opposed shaft housing ends, the laterally-opposed shaft housing ends each extending through said inner surface and said outer surface at laterally-opposed points, said laterally-opposed shaft housing ends each further comprising:
      a securely held bearing member, each bearing member further comprising hexagonal shaft receiving structure;
   a hexagonal shaft member rotatably received within said shaft housing, the shaft member having laterally-opposed terminal ends extending laterally outward from said laterally-opposed shaft housing ends, said laterally-opposed terminal ends having a shaft long axis extending therebetween, the shaft long axis having a horizontal axis of rotation extending therethrough;
   a pair of wings, the wings having laterally-opposed placement relative to said wingless imitation bird structure, said wings each further comprising:
      a dorsal surface;
      a ventral surface;
      a proximally-located integrally-formed hexagonal socket intermediate said dorsal surface and said ventral surface, the proximally-located integrally-formed hexagonal sockets each slidably and securely engaged with said laterally-opposed terminal ends permitting said wings and said hexagonal shaft member to co-rotate through 360 degrees in unison together about said horizontal axis of rotation; and
      a plurality of rotor blade members adjustably mounted on said wings for collecting and converting kinetic wind energy to rotational power in said shaft member which when collected causes said wings, said shaft member and said rotor blade members to rotate in unison through 360 degrees about said horizontal axis of rotation relative to said wingless imitation bird structure in a clockwise direction or in a counter-clockwise direction depending on kinetic wind energy being directed against said rotor blade members, the rotor blade members thus creating wing movement in said wings and in said rotor blade members for alluring birds located vertically, laterally and longitudinally relative to said decoy apparatus.

2. The decoy apparatus of claim 1, wherein said wings lie in substantially different planes intersecting at said horizontal axis of rotation.

3. The decoy apparatus of claim 2, wherein said wings each have a pair of vertically aligned, dorsally/ventrally-opposed propeller-shaped rotor blade members.

4. The decoy apparatus of claim 3, wherein said rotor blade members have pitch control means adjustably mounting said rotor blade members on said wings, each pitch control means for setting pitch of said rotor blade members enabling each rotor blade member to be positioned in a preset orientation with respect to each said wing to adjust for the desired collection of available kinetic wind energy to achieve the most efficient RPM rotational value of each said wing and each said rotor blade member according to the field conditions or availability of kinetic wind energy where waterfowl decoy apparatus is set-up for decoy attraction purposes.

5. The decoy apparatus of claim 4, wherein said vertically-aligned, dorsally/ventrally-opposed, propeller-shaped rotor blade members are weighted so as to allow said wings to rotatably rest with said ventral surface facing substantially downward.

6. The decoy apparatus of claim 5, wherein said wings each further comprise a dorsally-located visual identifying pattern, the dorsally-located visual identifying pattern further comprising:
species-specific variable coloration depending on the waterfowl species sought to be allured.

7. The decoy apparatus of claim 6 wherein said wings each have visually correct anatomical wing shape.

8. The decoy apparatus of claim 7 wherein said interior body chamber is further defined by being capable of receiving an optional motor assembly.

9. A decoy apparatus for alluring universally-located game comprising:
a central support structure;
a transverse shaft rotatably received in said central support structure, the transverse shaft having laterally-opposed terminal shaft ends, the laterally-opposed terminal shaft ends having a shaft long axis extending therebetween, the shaft long axis having an axis of rotation extending therethrough;
a pair of wings laterally opposed relative to said central support structure, the wings each further comprising:
a dorsal surface;
a ventral surface;
a proximally-located attachment structure, the proximally-located attachment structures each for attachment to said laterally-opposed terminal shaft ends which when attached permit said wings and said transverse shaft to co-rotate in unison together about said axis of rotation; and
a plurality of rotor blade members adjustably mounted on said wings for collecting and converting kinetic wind energy to rotational power in said transverse shaft member which when collected and converted causes said wings, said transverse shaft and said rotor blade members to rotate in unison relative to said central support structure, said rotor blade members being rotatable 360 degrees in unison in a clockwise direction or in a counter-clockwise direction relative to said central support structure depending on kinetic wind energy being directed against said rotor blade members, the rotor blade members thus creating wing movement in said wings and in said rotor blade members for alluring game located vertically, laterally and longitudinally relative to said decoy apparatus.

10. The waterfowl decoy apparatus of claim 9, wherein said wings lie in substantially different planes intersecting at said axis of rotation.

11. The decoy apparatus of claim 10 wherein said rotor blade members are vertically aligned and dorsally/ventrally-opposed on said wings.

12. The decoy apparatus of claim 11 wherein said rotor blade members have pitch control means adjustably mounting said rotor blade members on said wings, each pitch control means for setting pitch of each said rotor blade member enabling each said rotor blade member to be positioned in a preset orientation with respect to each said wing to adjust for the desired collection of available kinetic wind energy to achieve the most efficient RPM rotational value of each said wing and each said rotor blade member according to the field conditions or availability of kinetic wind energy where said decoy apparatus is set-up.

13. The decoy apparatus of claim 12 wherein said wings and said rotor blade members are further defined by species-specific coloration depending on the game species sought to be allured.

14. The decoy apparatus of claim 13 wherein said wings each further comprise a dorsally-located visual identifying pattern, the dorsally-located visual identifying pattern further comprising:
a species-specific light-absorbent portion, the species-specific light-absorbent portion further defined by having variable coloration depending on the waterfowl species sought to be allured.

15. The decoy apparatus of claim 14 wherein the decoy apparatus is fixedly mounted on a swivel mounting system allowing said decoy apparatus to be selectively oriented, the swivel mounting system further comprising:
a swivel head, the swivel head allowing for triaxial selective orientation; and
a rigid rod-like anchoring member, the rigid rod-like anchoring member having a support end and a base end opposite the support end, the support end attached to said swivel head, the base end having a pointed terminus for piercedly and fixedly anchoring the rigid rod-like anchoring member in the earth.

16. A decoy kit for outfitting a preexistent decoy which when outfitted enables the preexistent decoy to allure universally-located birds, the decoy kit having component parts comprising the combination of:
a shaft member, the shaft member having laterally-opposed terminal ends, the laterally-opposed terminal ends having a shaft long axis extending therebetween, the shaft long axis for providing a transversely-disposed axis of rotation through the preexistent decoy;
a shaft housing, the shaft housing having two laterally-opposed shaft housing ends, the laterally-opposed shaft housing ends having a shaft housing long axis extending therebetween, the shaft housing long axis for providing transversely-disposed structural support through the preexistent decoy which when provided rotatably receives said shaft member and rotatably supports said shaft long axis, each laterally-opposed shaft housing end further comprising:
a securely held bearing member;
a pair of wings, the wings each further comprising:
a dorsal surface;
a ventral surface;
a proximally-located integrally-formed socket intermediate said dorsal surface and said ventral surface, the proximally-located integrally-formed sockets each for secure attachment to said laterally-opposed terminal ends which when attached have laterally-opposed placement relative to the preexistent decoy permitting said wings and said shaft member to co-rotate through 360 degrees in unison together about said transversely-disposed axis of rotation; and a pair of vertically-aligned dorsally/ventrally-opposed rotor blade members adapted to be adjustably mounted on each said wing, each pair of vertically-aligned dorsally/ventrally-opposed rotor blade members for collecting and converting kinetic wind energy to rotational power in said shaft member which when collected and converted causes said wings, said shaft member and each said pair of vertically-aligned dorsally/ventrally-opposed rotor blade members to rotate in unison through 360 degrees relative to the preexistent decoy in a clockwise direction or in a counter-clockwise direction depending on kinetic wind energy being directed against each said pair of vertically-aligned dorsally/ventrally-opposed rotor blade members, each said pair of vertically-aligned dorsally/ventrally-opposed rotor blade members thus creating wing movement in said wings and in each said pair of vertically-aligned dorsally/ventrally-opposed rotor blade members for alluring birds located vertically, laterally and longitudinally relative to the preexistent decoy.

17. The decoy kit of claim 16 wherein the decoy kit further comprises pitch control means adjustably mounting said rotor blade members on said wings, each pitch control means for setting pitch of said rotor blade members enabling each rotor blade member to be positioned in a preset orientation with respect to each said wing to adjust for the desired collection of available kinetic wind energy to achieve the most efficient RPM rotational value of each said wing and each said rotor blade member according to the field conditions or availability of kinetic wind energy where waterfowl decoy apparatus is set-up for decoy attraction purposes.

18. The decoy kit of claim 17 wherein the decoy kit further comprises:
   a decoy structure for replacing the preexistent decoy, the decoy structure further comprising:
   an inner surface, the inner surface defining an interior body chamber for receiving said shaft housing; and
   an outer surface, the outer surface anatomically configured to resemble a bird structure, the bird structure having species-simulating markings.

* * * * *